May 5, 1953 G. F. WISLICENUS ET AL 2,637,248
VANE GENERATING MACHINE
Filed Sept. 16, 1947 18 Sheets-Sheet 1

G. F. WISLICENUS
P. C. ZUMBUSCH
INVENTORS
BY
Attorney

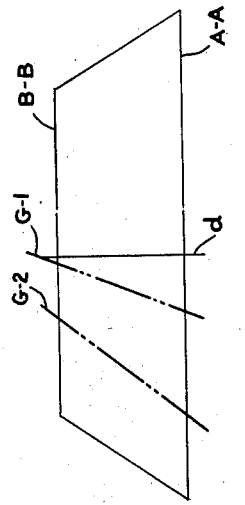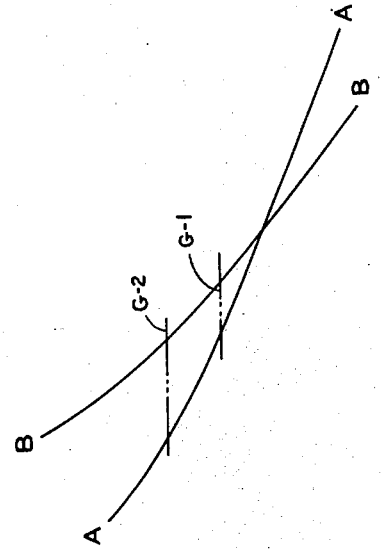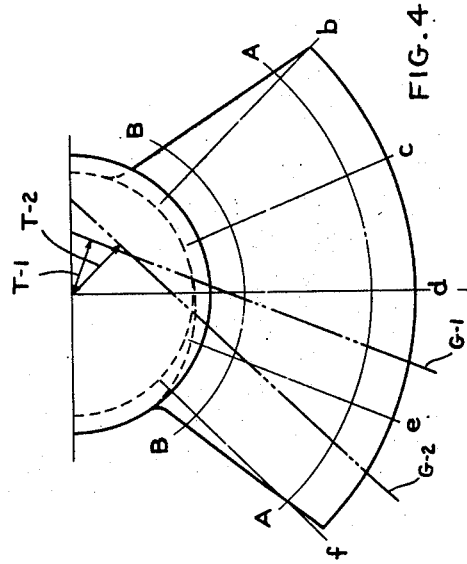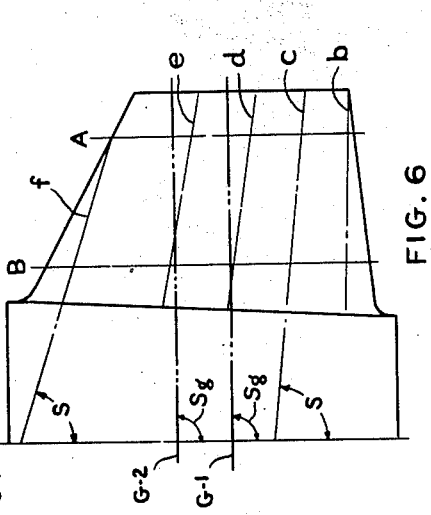

May 5, 1953  G. F. WISLICENUS ET AL  2,637,248
VANE GENERATING MACHINE
Filed Sept. 16, 1947  18 Sheets-Sheet 3

G. F. WISLICENUS
P. C. ZUMBUSCH
INVENTORS

BY
attorney

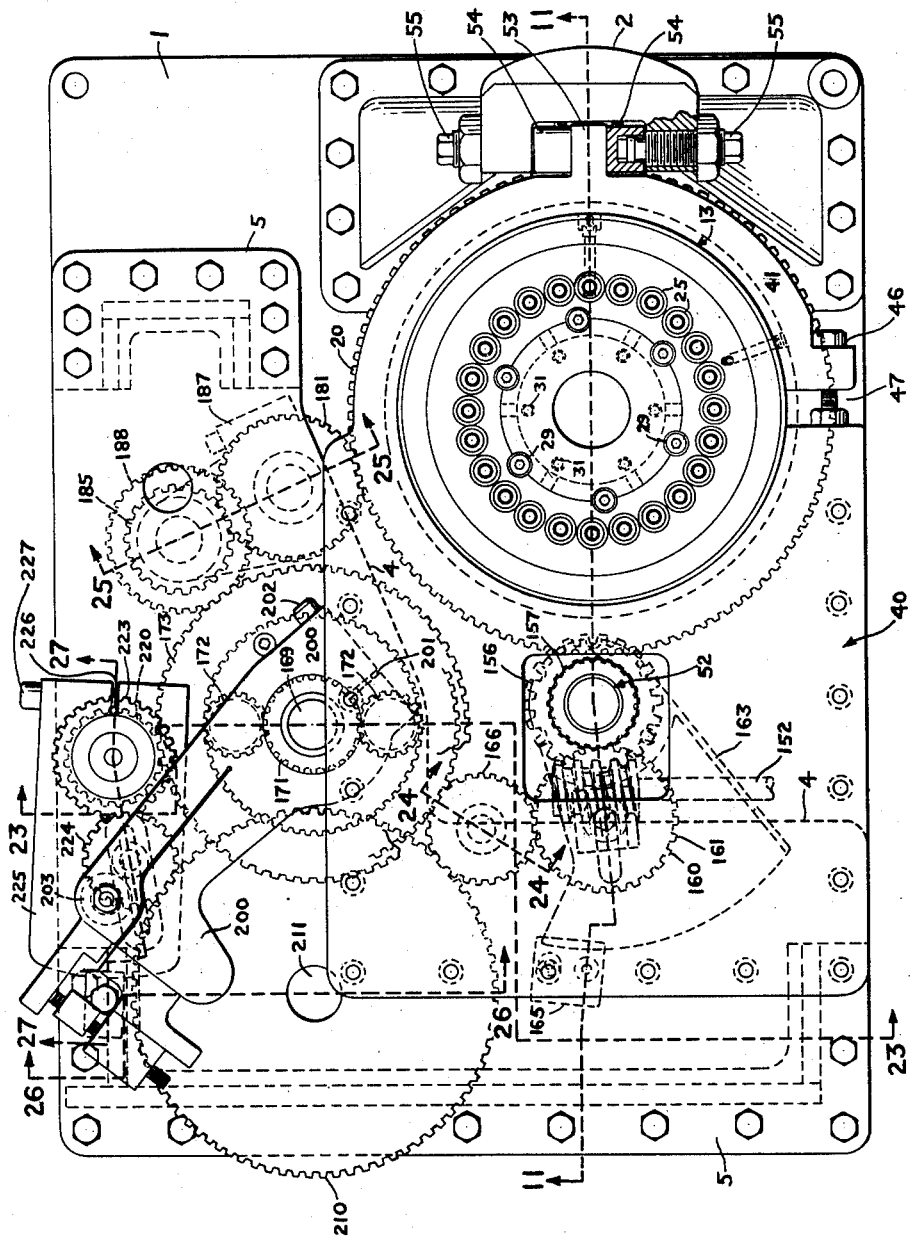

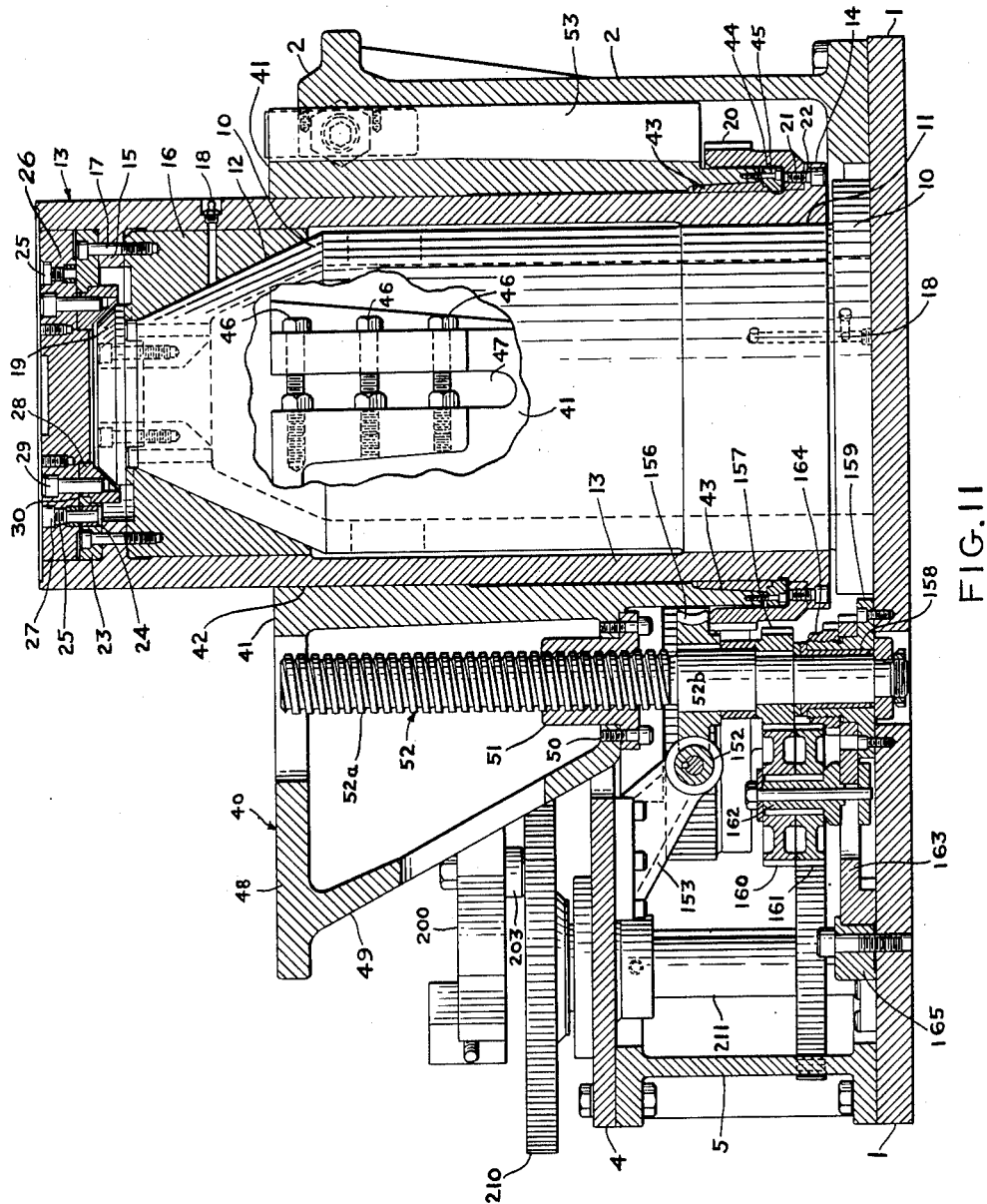

May 5, 1953     G. F. WISLICENUS ET AL     2,637,248
VANE GENERATING MACHINE
Filed Sept. 16, 1947     18 Sheets-Sheet 6
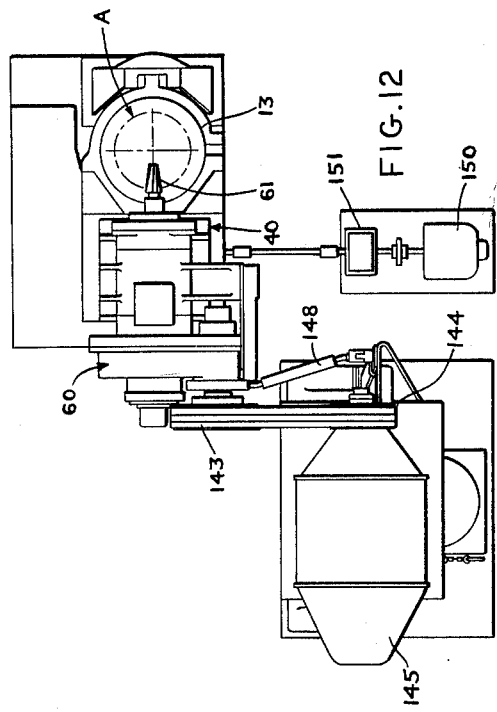
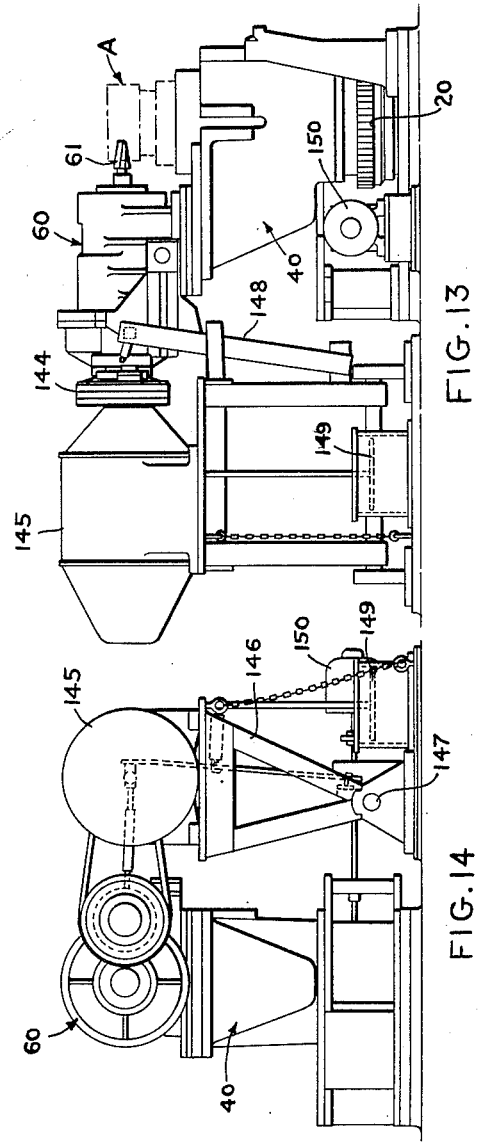
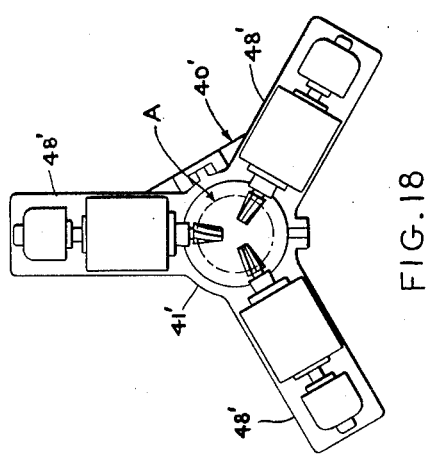
G.F. WISLICENUS
P.C. ZUMBUSCH
INVENTORS

G.F. WISLICENUS
P.C. ZUMBUSCH
*INVENTORS*

May 5, 1953

G. F. WISLICENUS ET AL 2,637,248

VANE GENERATING MACHINE

Filed Sept. 16, 1947

G. F. WISLICENUS
P. C. ZUMBUSCH
INVENTOR.

BY
attorney

May 5, 1953　　G. F. WISLICENUS ET AL　　2,637,248
VANE GENERATING MACHINE
Filed Sept. 16, 1947　　18 Sheets-Sheet 9
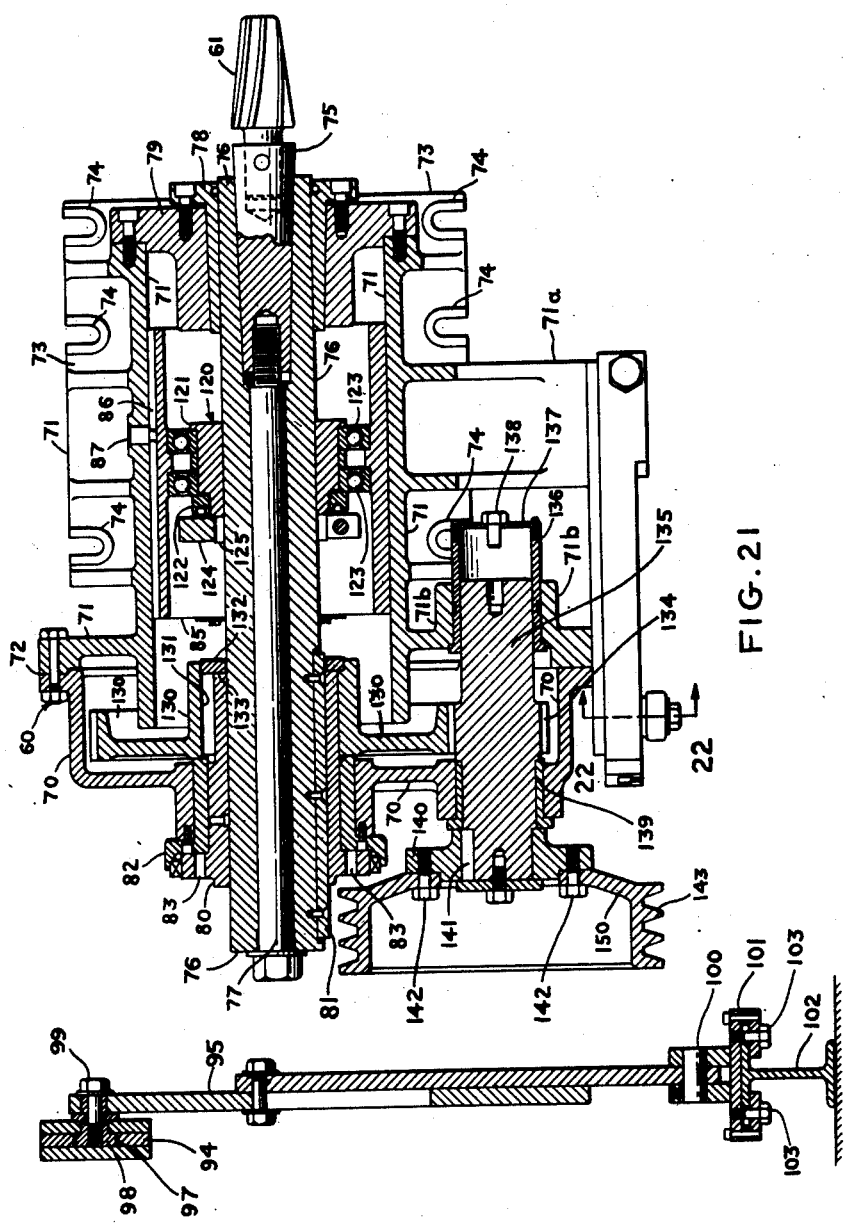
G.F. WISLICENUS
P.C. ZUMBUSCH
INVENTORS May 5, 1953 G. F. WISLICENUS ET AL 2,637,248
VANE GENERATING MACHINE
Filed Sept. 16, 1947 18 Sheets-Sheet 10

G.F. WISLICENUS
P.C. ZUMBUSCH
INVENTORS

BY
attorney

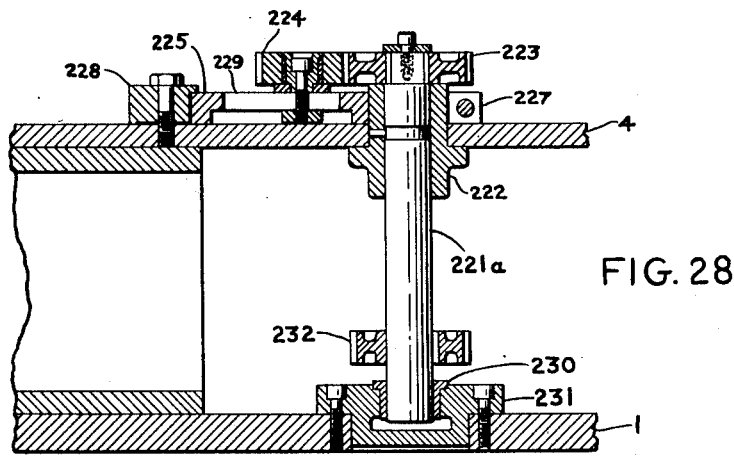
FIG. 28
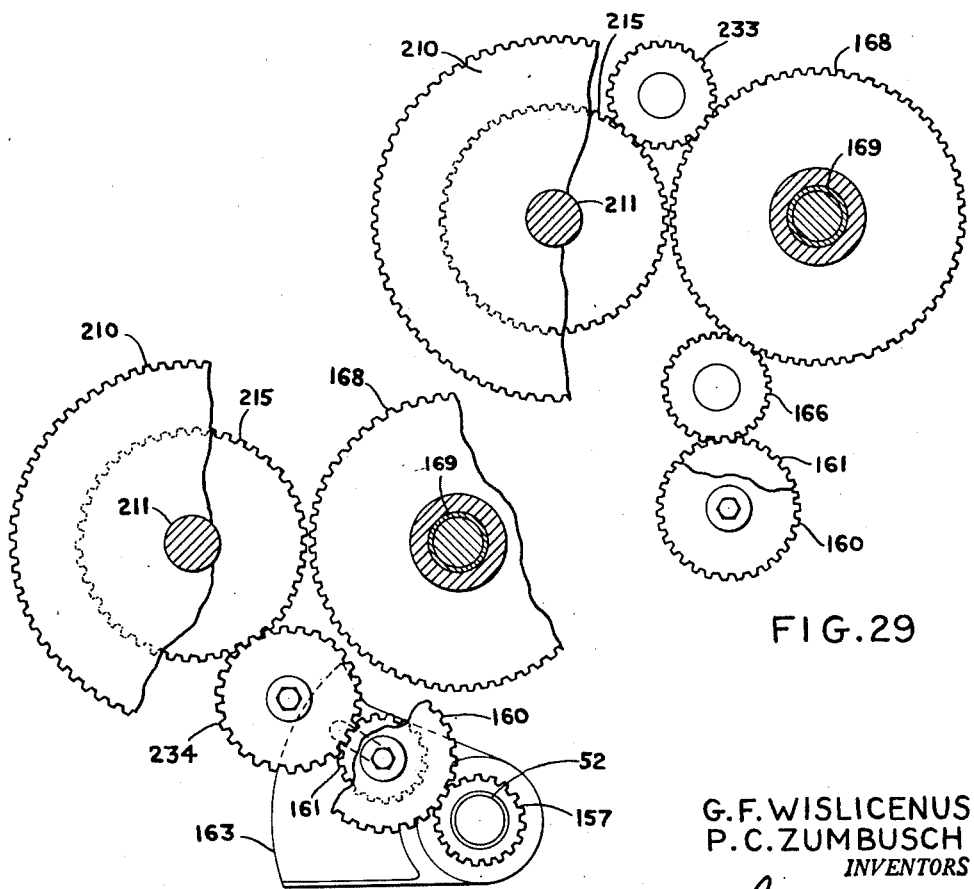
FIG. 29
FIG. 30
G. F. WISLICENUS
P. C. ZUMBUSCH
INVENTORS
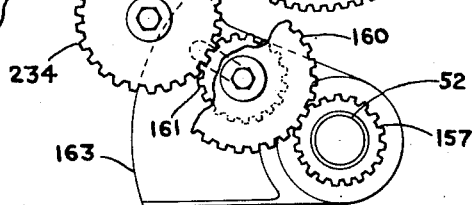

G. F. WISLICENUS
P. C. ZUMBUSCH
INVENTORS

May 5, 1953 G. F. WISLICENUS ET AL 2,637,248
VANE GENERATING MACHINE
Filed Sept. 16, 1947 18 Sheets-Sheet 14
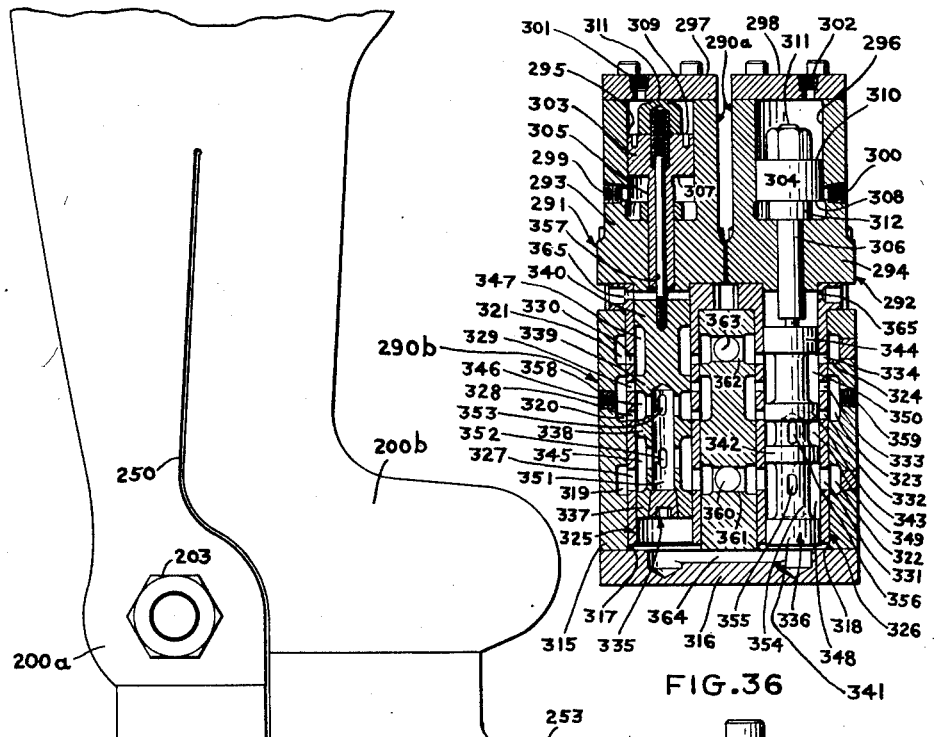
FIG. 36
FIG. 34
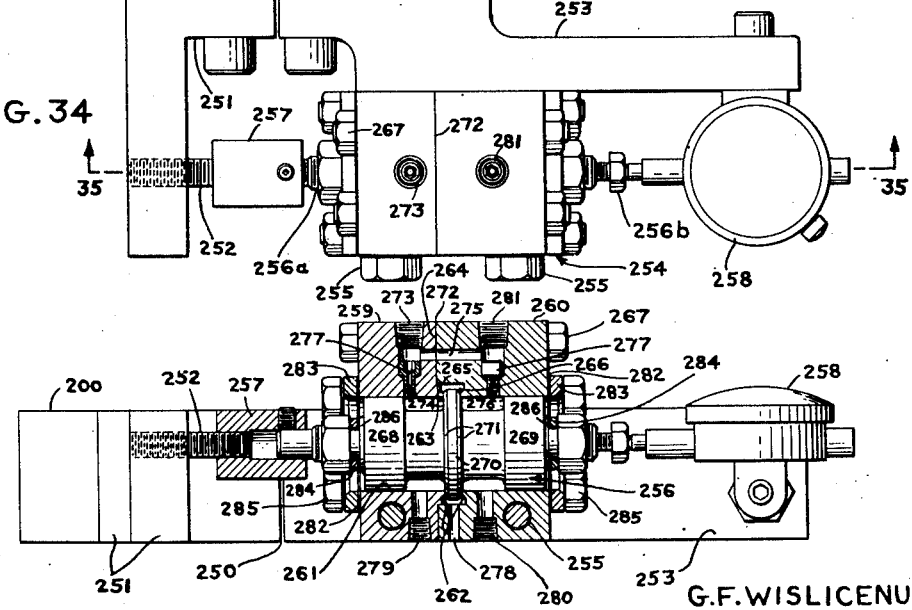
FIG. 35
G.F. WISLICENUS
P.C. ZUMBUSCH
INVENTORS
BY Robert Meyer
ATTORNEY May 5, 1953 G. F. WISLICENUS ET AL 2,637,248
VANE GENERATING MACHINE
Filed Sept. 16, 1947 18 Sheets-Sheet 15

G. F. WISLICENUS
P. C. ZUMBUSCH
INVENTORS

May 5, 1953     G. F. WISLICENUS ET AL     2,637,248
VANE GENERATING MACHINE

Filed Sept. 16, 1947     18 Sheets—Sheet 16

G. F. WISLICENUS
P. C. ZUMBUSCH
INVENTORS

May 5, 1953     G. F. WISLICENUS ET AL     2,637,248
VANE GENERATING MACHINE
Filed Sept. 16, 1947                       18 Sheets-Sheet 18

G. F. WISLICENUS
P. C. ZUMBUSCH
*INVENTORS*

BY *Robt Meyer*
*attorney*

Patented May 5, 1953

2,637,248

UNITED STATES PATENT OFFICE 2,637,248

VANE GENERATING MACHINE

George F. Wislicenus, Toledo, Ohio, and Peter C. Zumbusch, Upper Montclair, N. J., assignors to Worthington Corporation, a corporation of Delaware Application September 16, 1947, Serial No. 774,272

21 Claims. (Cl. 90—11.54)

This invention relates to generating machines and, in particular, refer to machines for generating surfaces which are basically helical.

Though not to be regarded as limiting, the particular use contemplated for the present invention is to generate fluid engaging surfaces on the rotors of fluid machines, such rotors being represented in the present application by an axial flow impeller having radially extending vanes with modified helical surfaces.

Heretofore, it has been the practice to produce such impellers by the conventional methods of casting from patterns or core boxes and hand finishing. Accordingly, the main object of the present invention is to provide means for generating impellers by mechanically controlled motions. Among the many advantages of impeller production by the means of the present invention as compared with production by casting are an increase in the rate of production and a decrease in unit cost, an elimination of non-uniformity in successive vanes of the same shape, an increase in the accuracy and smoothness of the vane surfaces, and a reduction in the thickness of the vanes. Another advantage is an increase in the strength of the impellers since the present invention makes it possible to produce impellers from wrought metals, preferably forgings.

An important object of the present invention is to permit machining of geometrically similar vane surfaces of different absolute dimensions by means of one cam (factoring). Another object is to permit modifications in the geometry of the vane surface produced by the same cam.

With these and other objects in view, as may appear from the accompanying specification, the invention consists of various features of construction and combination of parts, which will be first described in connection with the accompanying drawings, showing a vane generating machine of a preferred form embodying the invention, and the features forming the invention will be specifically pointed out in the claims.

Figure 4 is a plan view of another impeller vane surface generable by the machine of the present invention.

Figure 4a is a development of the vane surface of Figure 4 bounded by lines A—A and B—B.

Figure 5 shows the developed cylindrical sections taken along the lines A and B of Figure 4.

Figure 6 shows the radial sections $b$, $c$, $d$, $e$, and $f$ of Figure 4 in the plane of radial section $d$.

Figure 10 is a plan view of the machine with the impeller block and fixture, the cutter means, and the structure of subassembly D removed.

Figure 11 is a vertical section through the machine taken along the line 11—11 of Figure 10.

Figure 12 is a plan view of the machine, with subassembly D removed, and shows in particular an arrangement of the cutter means.

Figure 13 is a front elevation of the device shown in Figure 12.

Figure 14 is a left side elevation of the device shown in Figure 13.

Figure 18 is a plan view of another form of tool table and cutter means which may be used in the machine.

Figure 21 is a horizontal, longitudinal section taken on the line 21—21 of Figure 20.

Figure 22 is a vertical section taken along the line 22—22 of Figure 21.

Figure 28 shows alternative gear set-up (2) for driving the cam table as it would appear in a section taken on line 27—27 of Figure 10.

Figure 29 is a partial plan view of the machine, with parts broken away, as it would appear if gear set-up (3) were used to drive the cam table.

Figure 30 is a partial plan view of the machine, with parts broken away, to show how it would appear if gear set-up (4) were used to drive the cam table.

Figure 34 is a plan view of a portion of the follower arm with the pneumatic relay valve attached thereto.

Figure 35 is a vertical section taken on line 35—35 of Figure 34.

Figure 36 is a vertical section through the oil control valve.

Figure 43 is a partial plan view of an alternative arrangement which may be embodied in the device of Figure 41 to produce a lateral component.

Figure 3:
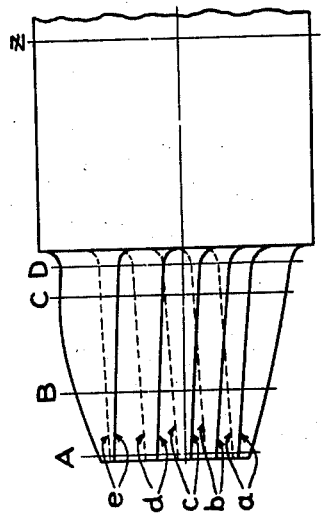
Figure 3 shows the radial sections $a$, $b$, $c$, $d$, and $e$ of Figure 1 lying in the plane of radial section.
Figure 7:
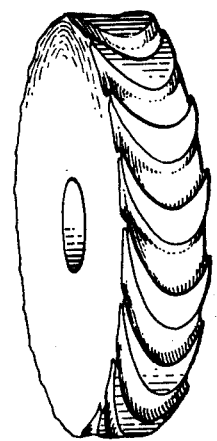
Figure 7 shows a type of turbine bucket which may be generated by the machine of the present invention.
Figure 1:
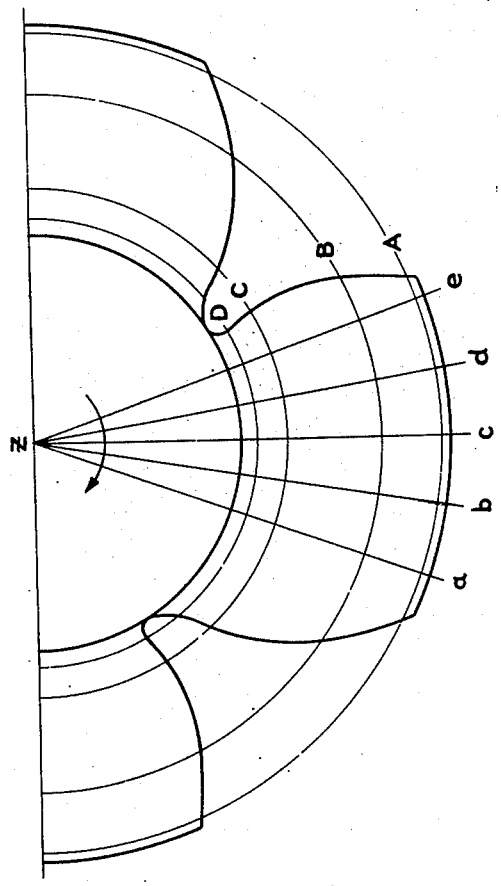
Figure 1 is a plan view of an impeller having a vane generable by the machines of the present invention.
Figure 2:
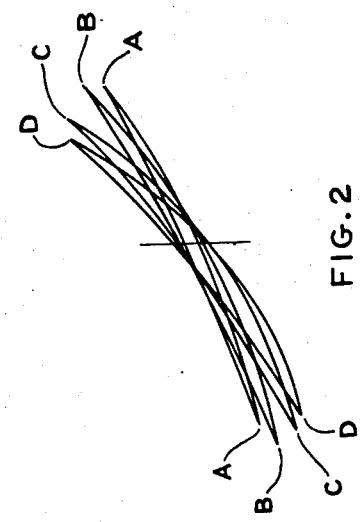
Figure 2 shows the developed cylindrical sections taken along the lines A, B, C, and D of Figure 1.

The generating machines to be presently described may be used to generate surfaces of the general types represented by the vane surfaces of Figures 1-7. The surfaces of Figures 1-3 are helical surfaces of varying pitch which have parallel radial sections $a, b \ldots e$, as shown in Figure 3. The surfaces of Figures 4-6 differ from those of Figures 1-3 in that the radial sections are not parallel. Certain species of this class of surfaces may be generated by the machine shown in perspective in Figure 8 by laterally offsetting the cutter with respect to the axis of the impeller. The most general form of this class of surfaces may be easily generated, however, by the machine of Figures 41-45 which incorporates a lateral feed of the cutting tool. Either machine will generate the surfaces of Figures 1-3, the conical hub of Figures 4-6, or the reversely curved turbine buckets of Figure 7.

Preferably, the machines of the present invention mill the above described vane surfaces from solid forgings or impeller blocks as they will hereinafter be referred to. Obviously, the ultimate function of the machine is to produce relative motion between the cutter and the impeller block, this motion being the generating or feed motion, which is so controlled that the locus of the line of tangency (generatrix) between the cutter and the block will be the desired surface. The basic kinematic principle of the machine is the separation of this generating motion of the cutter relative to the block into two parts, viz., First, a simple helical motion of constant pitch, and Second, a departure of the feed motion from this simple helical motion to meet the specific requirements of the shape desired. As is well known, helical motion has both rotary and axial components so, in the preferred form of the machine, the impeller block is rotated and the cutter is moved axially relative to the axis of the impeller. The means producing these two motions are interconnected, in the preferred form, by a system of gears. As long as this system of gears is unchanged, the relationship or ratio between the axial and rotary motions is fixed so that the cutter will have the first part of the generating motion, i. e., motion corresponding to a helix of constant pitch. Differential gearing is included in the gear train to provide means for obtaining the second part of the generating motion. A cam actuates the differential gearing to modify the ratio between the axial and rotary components of the feed motion and, therefore, to obtain the desired departure from a simple helical motion.

Motion of the type just described will produce an impeller of the type shown in Figures 1-3 in which the radial sections are parallel and the hub cylindrical. In order to produce a hub of varying diameter, such as shown in Figures 4-6, the feed motion must have an additional component in a direction radial to the axis of the impeller. Radial feed is accomplished in this invention by providing a cutter which is actuated to movement along its own axis (radial to the impeller) by the above described axial component of the feed motion. Radial feed produces no change in the relationship between the cutter axis and the impeller axis; the change is in the radial distance of the end of the cutter from the impeller axis.

In order to produce a wide range of surfaces having non-parallel radial sections, such as shown in Figures 4-6, another component must be added to the feed motion. This is called the "lateral component" and is motion of the cutter so that its axis moves perpendicularly to the impeller axis. The machine of Figures 41-45 has a feed with a lateral component. The principles underlying this component are similar to those outlined above for the axial and rotary components and, in the preferred form of the machine, the lateral component is related to the axial component by similar means. Two cams are, therefore, required for the embodiment of the invention shown in Figures 41-45.

The essential structure comprising the preferred form of the means for imparting the above described generating motion to the cutter may be most conveniently described by dividing it into three groups or sub-assemblies in addition to the frame and general structural members.

Subassembly A includes a rotatable work table, means for rigidly holding the impeller block, and means for indexing the same. The rotary component of the feed motion is produced in this subassembly.

Subassembly B includes the cutting tool and means for operating it. The cutter is carried on a tool table which is mounted so that it is movable along or parallel to the work table axis, thus providing the axial component of the feed motion. The cutter is so constructed as to be movable radially with respect to the work table axis, to provide the radial component of the feed motion. In the structure of Figures 41–45, the cutter is also constructed for either lateral or pivotal movement so as to provide the lateral component of the relative motion. In the embodiment of Figures 8 and 15–17 means are provided for laterally offsetting the cutter and for varying the angle between its axis and the impeller axis.

Subassembly C is the transmission system and includes a power supply and, preferably, a gear train relating the radial and rotary components to the axial components. It also includes cam means for varying the relationship of the axial and rotary components. In the embodiment of Figures 41–45, the lateral component is also related to the axial component by a gear train of the same type as used to interconnect the rotary component and the axial component.

There is also a fourth subassembly, subassembly D, which is not indispensable to the functioning of the machine but which is extremely desirable. It insures that the second part of the feed motion, the departure from a simple helical motion, is accurately transmitted from the cam to the final feed motion. This subassembly includes a motor for furnishing supplemental power to rotate the work table and means for actuating the motor, the means being actuated by variations in the pressure of the cam roller on the cam.

These four subassemblies will be described separately and will first be discussed in connection with the device of Figure 8.

Figure 8:
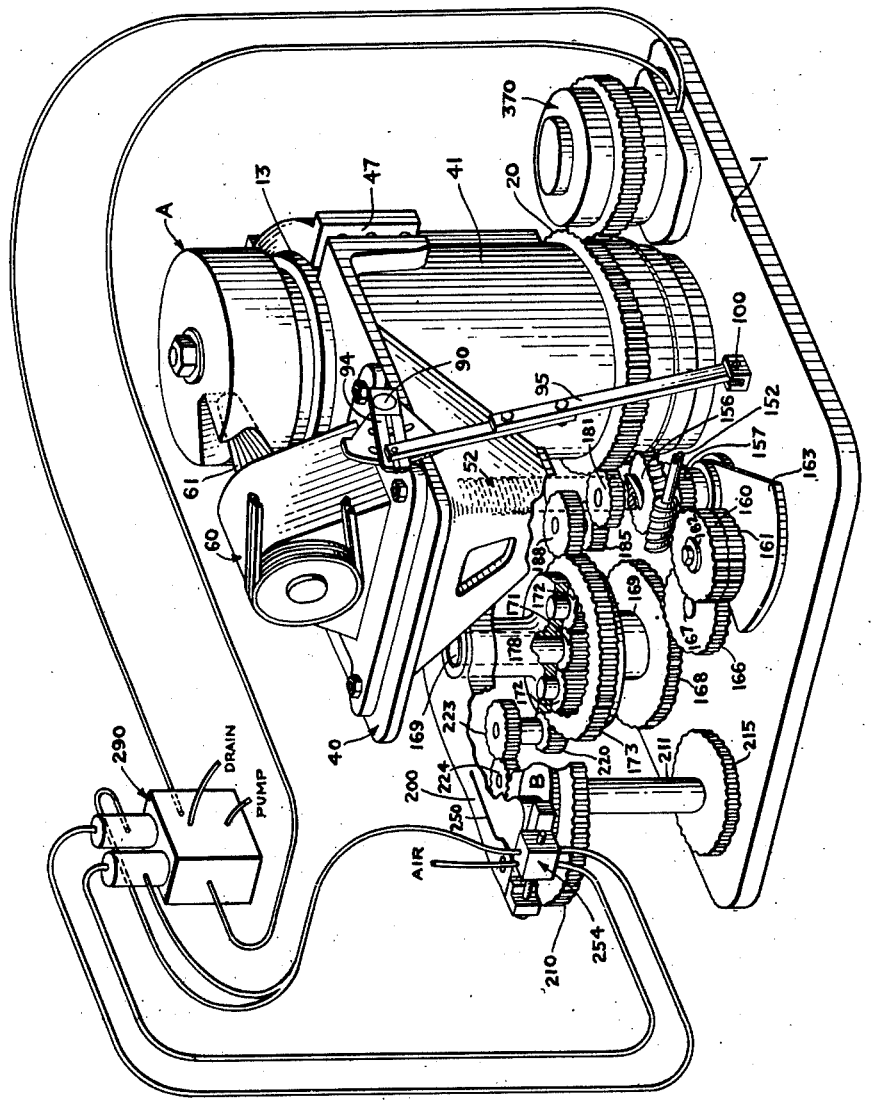
Figure 8 is a perspective view, with parts removed, of an embodiment of the invention which provides axial, rotary, and radial components of the feed motion.

The device of Figure 8:

*Subassembly A*

This subassembly includes the structure for holding, rotating, and indexing the impeller block A. It is best illustrated in Figures 8 and 11, though it will be understood that the invention is not limited to the specific structure there shown.

In the embodiment selected for illustration, the work table assembly has a column 10 which is rigidly attached by suitable means to the base plate 1 of the machine. The column 10 has a lower cylindrical bearing surface 11 and an upper frusto-conical bearing surface 12. The work table cylinder 13 encloses the column 10 and is rotatable upon the bearing surface 11. The work table cylinder 13 has a bottom outer flange 14 and an inner flange 15 near its upper end. A thrust bearing 16 is bolted at 17 to the inner flange 15 and has a conical bearing surface which engages the conical bearing surface 12. The work table 13 is thus rotatably connected to the column 10 at the bearing surfaces 11 and 12. Suitable lubricating passages and fittings 18 are, of course, provided for these bearing surfaces and a retainer 19 is bolted to the top of the column 10 and bears against the inner diameter of the thrust bearing 16 to prevent end play. A ring gear 20 has an inwardly extending flange 21 at its bottom end by which it is connected at 22 to the cylinder flange 14. The ring gear 20 is connected to the gear train which will be discussed under subassembly C and furnishes means for rotating the work table 13.

A specific indexing arrangement is provided at the top of the cylinder 13, though, of course, other indexing devices, such as those procurable on the open market, may be employed. In this indexing arrangement a lower plate 23 is bolted at 17 to the inner flange 15 and is thus rotatable with the cylinder or work table 13. The plate 23 has twenty bushed holes 24 which are equi-angularly distributed on the same diameter as the twenty-four equi-angularly spaced tapped and bushed holes 25 in the upper plate 26. One threaded pin 27 screws into a hole 25 which is aligned with one of the holes 24 and connects the plate 26 for rotary movement with the plate 23. It is seen that this arrangement provides indexing increments of three degrees since this amount of relative angular movement is required to align another hole 25 with a hole 24. A locking ring 28 is bolted at 29 to the upper plate 26 and has a stepped outer diameter which engages the stepped inner diameter of the lower plate 23, as shown at 30, to prevent vertical upward movement of the upper plate 26. The threaded holes 31 in the top of the upper plate permit attachment thereto of an impeller block holding fixture.

*Subassembly B*

This subassembly includes structure for rotating the generating tool and for moving the same axially and radially with respect to the axis of the impeller block A. Provision is also made for laterally offsetting the tool or for inclining its axis. It is best illustrated in Figures 8, 11, and 12–22.

There is a non-rotatable tool table 40 with a split cylindrical portion 41 which embraces the work table 13 and provides bearing surface 42 for the upper outer surface of the work table. A bearing sleeve 43 is inserted between the lower end of the cylindrical portion 41 and the cylinder 13 and is held in position by a retainer 44 which is bolted at 45 to the portion 41. The inner diameter of the cylindrical portion 41 may be adjusted slightly to compensate for slack or binding by means of the clamp bolts 46 which govern the width of the longitudinal split 47.

Integral with or attached to cylindrical portion 41 is a horizontal table or extension 48 to which the cutter head is attached. The inclined supporting web 49 connects the table 48 to a lower horizontal extension 50 which is joined to the cylindrical portion 41. The lead screw bushing 51 is bolted in the extension 50 to transfer the rotary motion of the lead screw 52 into vertical movement of the tool table 48. Vertical motion of the tool table is guided by the vertical guide flange 53 (Figure 10), integral with cylindrical portion 41, which rides between the shoes 54 carried by the frame 2. The bolts 55 in the frame 2 provide means for adjusting the pressure exerted by the shoes 54 on the guide 53.

The cutter head 60 is bolted to the table 48 and includes the cutting tool 61 which thus partakes of the vertical motion of the table (see Figure 8).

Figure 18 shows how the tool table 40' may be constructed if it is desired to cut more than one surface at a time. In this arrangement three horizontal extensions 48' are attached to the cylindrical portion 41' and the cutters and motors therefore are bolted to the three extensions.

Figure 15:
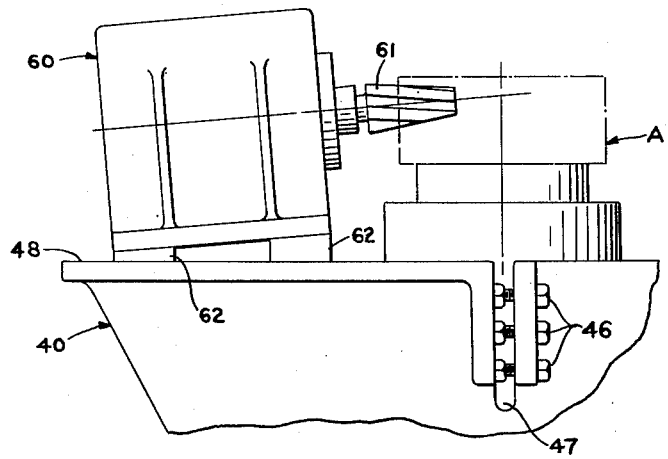
Figure 15 is a partial vertical section of the mounting of the cutter head on the tool table and shows means for inclining the axis of the cutting tool.

In Figures 8, and 12–14 it is apparent that the axis of the tool 61 is normal to the impeller axis but Figure 15 shows how the head 60 may be bolted to the table 48 so that an angle slightly different from ninety degrees is obtained. In this case blocks 62 are inserted under the cutter head 60 at the front and rear thereof and the head is bolted to the table 48 as before. The upper and lower faces of the blocks 62 are not parallel and the angle between them is, of course, the complement of the acute angle which the tool axis will make with the impeller axis.

Figure 16:
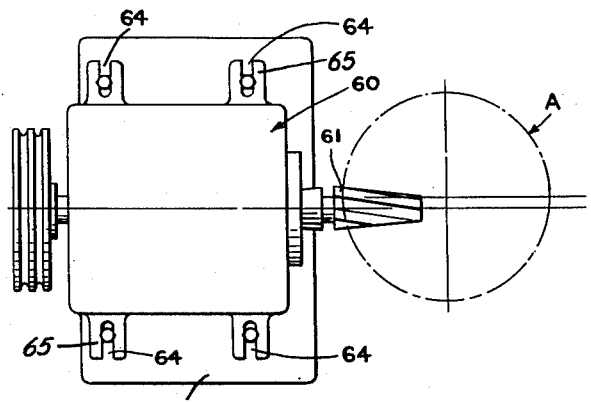
Figure 16 is a schematic plan view, with parts removed, showing the cutter head mounted on the tool table for lateral adjustment.
Figure 17:
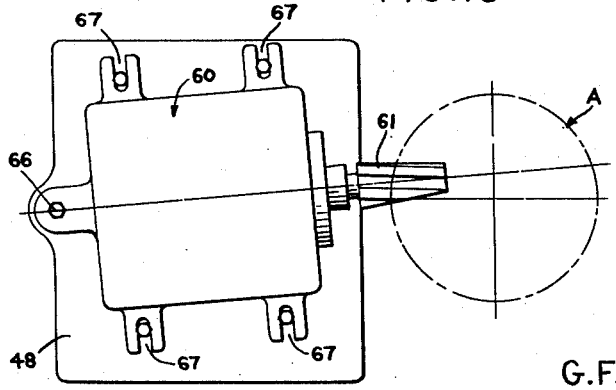
Figure 17 is a schematic plan view, with parts removed, showing the cutter head pivotally mounted on the tool table.

In Figure 12 it is apparent that the tool axis intersects the impeller axis. Figures 16 and 17 show two ways in which the tool axis may be laterally offset from the impeller axis. In Figure 16 this is accomplished simply by slotting the bolt holes 64 in the cutter head flange 65 so that the cutter head is movable parallel to itself in a lateral direction. All points on the cutting tool 61 will in this case be offset equal lateral increments. In Figure 17 the cutter head 60 is pivoted at 66 to the table 48 and the bolt holes 67 are slotted to permit pivotal movement. In this case all points on the cutting tool will be offset by different lateral increments.

As best shown in Figures 19–22, the cutter head 60 is constructed so that the cutting tool 61 can be moved along its axis, or radially with respect to the impeller axis, while it is being rotated. The head 60 includes two cover and frame members 70 and 71 which are joined together at 72, the joint lying in a plane perpendicular to the tool axis. The frame 71 has an integral base plate 73 which has slotted bolt holes 74 to facilitate lateral adjustment of the tool axis, as discussed in connection with the bolt holes 64 of the Figure 16.

As is common, the cutting tool 61 is rigidly fixed to a tapered adapter 75 which is wedged into its mating hole in the end of (and for rotary movement with) the tool tube 76 by means of the coaxial stud 77 which abuts the outside end of the tool tube 76. To permit rotation and axial movement, the tube 76 is mounted at the tool end of the cutter head in a bushing 78 which is pressed in and bolted to a cover 79 bolted to the cylindrical casing of the frame 71. At the opposite end, or pulley end, of the cutter head the tube 76 is connected for axial, but not rotary movement to the sleeve-like pulley connector 80 by the key 81. The pulley connector 80 is mounted in the bushing 82 which is attached to the frame 70. While not specifically illustrated, it is clear that a pulley could be bolted at 83 to the pulley connector 80 to directly rotate the tube 76 and cutting tool 61.

Figures 19, 20:
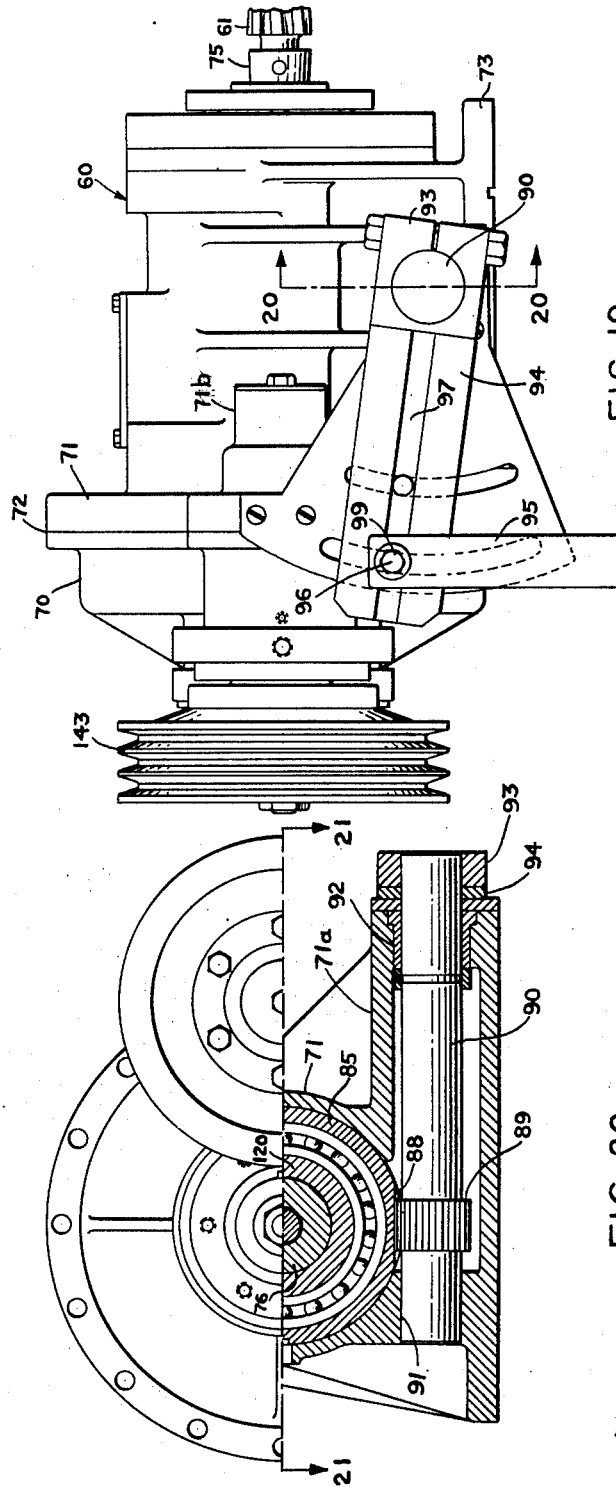
Figure 19 is a side elevation of one form of cutter head which may be used on the machine.
Figure 20 is partly a side elevation taken from the left of Figure 16 and partly a section taken along the line 20—20 of Figure 19.

A sleeve-like bearing and rack 85 is fitted inside the cylindrical casing of the frame 71 for axial but not rotary movement by means of the longitudinal slot 86 in its outer wall and the pin 87 in the cylindrical wall of the frame 71. As shown in Figure 20 the bottom of the sleeve 85 comprises a longitudinal rack 88 driven by the pinion 89 which is a part of the rocker shaft 90. The rocker shaft 90 is suitably mounted for pivotal movement in the extension 71a of the frame 71 as shown at 91 and 92 and extends outside of the extension 71a where it is connected by a clamp block 93 to the rocker arm 94. Thus, pivotal movement of the rocker arm 94 will rotate the pinion 89 and cause axial movement of the sleeve 85.

Structure is provided so that vertical movement of the tool table 40 to which the cutter head 60 is bolted, will cause rotation of the rocker shaft 90. As shown in Figures 19 and 22 a connecting rod 95 of adjustable length operatively connects the rocker arm 94 to the floor or base plate 1. The rod 95 fixes the height of a point 96 on the rocker arm so that when the tool table 40 is moved vertically the arm will in effect pivot about the point 96 and will also cause pivotal movement of the rocker shaft 90. The rod 95 is removably fixed for longitudinal sliding adjustment relative to the arm 94 and the floor or base plate 1. The arm 94 has an undercut longitudinal slot 97 and a block 98 is slidably mounted therein. The rod 95 is attached at point 96 to the block 98 by a bolt 99 threaded in the block. Tightening of the bolt 99 and the block 98 will clamp the rod 95 to the outer side of the arm. The lower portion of rod 95 is pinned at 100 to a rider block 101. The rider block 101 has re-entrant arms which slidably engage the upper leg of a longitudinal I beam 102 and are clamped thereto by the bolts 103. The I beam 102 is, of course, fastened to the floor or to the base plate 1. It is clear that by longitudinally adjusting the rod 95 in the slot 97, that is varying its lever arm or radial distance from the shaft 90, the ratio of vertical movement of the tool table 40 to axial movement of the cutter 61 will be varied. While the arm is shown on the left side of rocker shaft 90, it could be on the right side to cause axial motion in the opposite direction. Length adjustments of rod 95 will vary the starting point of the radial feed. The rod 95 is preferably attached to beam 102 so that it is substantially vertical.

A retainer 120 is fixed on the tube 76 and has a flange 121 at one end which together with a collar 122 threadably attached at the other end abut each end of the axially spaced bearings 123 which are pressed into the center section of the sleeve 85. An annular clamp 124 and sleeve 125 assist in the proper positioning of the retainer 120 on the tube 76. This arrangement permits the tube to rotate on bearings 123 and at the same time transfers axial forces through the bearings and the collared retainer to the tube so as to give the tube any axial motion caused by pivotal movement of the rocker arm 94 as previously described. It is obvious that it would in most cases be impractical to fasten the pulley directly to the tube by means of pulley connector 80 and bolt holes 83 when the tube is to have axial motion, since such a set-up would throw the driven pulley 143 out of alignment with the driving pulley 144. A cutter head construction is therefore provided which eliminates this undesirable feature and permits the pulley to be operatively connected to the tube while the latter is moving axially. A gear 130 fits in the cover 70 and is keyed to the pulley connector 80 and thus attached to the tube 76 as shown at 131. A lock ring 132 fits into an annular groove 133 in the end of the gear 130 and is screwed to the pulley connector 80 so that it, together with the bushing 82, prevents axial creeping of the gear 130. The gear 130 engages a pinion 134 on the pulley shaft 135. One end of shaft 135 is carried by the bushing 136 which is pressed into an extension 71b of the frame 71. As is clearly shown in Figure 21, the bushing is somewhat longer than required when the gear 134 engages the gear 130 and has a cover 137 closing its outer end. When the shaft 135 is attached to the cover 137 by the bolt 138, this extra length of the bushing permits the pinion 134 to be disengaged from the gear 130. In this position the shaft 135 will be out of the way when it is desired to attach the pulley to the pulley connector 80, as previously mentioned. The other end of the shaft 135 rides in a bushing 139, which is pressed into the cover 70, and has a flange 140 keyed to it at 141. The pulley 143 is bolted to the flange 140 as shown at 142. Regardless of axial motion of the tool 61, rotary motion may thus be transmitted from pulley 143 to flange 140, from flange 140 to shaft 135 and pinion 134, from pinion 134 to gear 130, from gear 130 to pulley connector 80, and from connector 80 to the tube 76 which carries the cutting tool 61. Relative axial motion between the means for rotating the tube and the tube 76 occurs, as previously indicated, at the junction of the connector 80 with the tube 76 and the keyway 81.

In either of its positions the driven pulley 143 is suitably connected to the driving pulley 144 of a motor 145 shown in Figures 12–14. Since the pulley 143 has vertical motion, it is apparent that the motor 145 must either be attached to the tool table 40 or be arranged so that it has motion to compensate for that of the pulley 143. In Figures 12–13 the motor 145 is mounted on a stand 146 which is pivoted at its lower end, as shown at 147. A tie rod 148 connects the cutter head 60 to the motor 145 so that vertical movements of the cutter head will cause the motor to pivot about axis 147 and thus maintain the distance between the centers of pulleys 143 and 144 substantially constant. A dash pot arrangement 149 is attached to the stand 146 to prevent free pivotal movement.

In Figures 12–14 the rod 95 has been removed so that there would be no radial feed.

Subassembly C

This subassembly is the power transmission system and includes structure for rotating the work table 13 and axially moving the tool table 40. These two motions are inherently in constant ratio so as to comprise a simple helical motion. Means are provided, however, through which a cam may continuously vary the ratio in a manner determined by the shape of the desired surface. The system includes elements which can be changed to vary the absolute dimensions of the vane as well as the geometry produced by the cam. While the preferred form of the system, illustrated best in Figures 8–11 and 23–30, is mechanical, those in the art will realize that pressure actuated or electrical systems could be used without departing from the broad features of the invention.

Power for rotating the work table 13 and moving the tool table 40 is furnished by a motor 150 (Figures 12–14) which is connected through a suitable speed reducer 151 to the worm 152. The worm 152 is supported by a bracket 153 (Figure 23) which is bolted to the cover plate 4 of the gear train. The cover plate 4 is substantially horizontal and is bolted on vertical supports 5 which are, in turn, bolted to the base plate 1.

The lead screw 52 comprises an upper threaded portion 52a, which is threaded similarly to a jackscrew, as clearly shown in Figure 11, and a lower shaft-like portion 52b. The worm wheel 156 is keyed to the shaft portion of the lead screw 52 and engages the worm 152. As previously described, rotation of the lead screw 52 in the bushing 51 causes vertical movement of the table 40. Rotation of the lead screw 52 also causes rotation of gear 157 which is fixed thereto and this gear acting through a gear train to be presently described rotates the work table 13. The lead screw 52 is carried by a bushing 158 in the housing 159 bolted to the base plate 1.

The gear 157 engages a gear 160 which, together with gear 161, is keyed to a spindle 162. The spindle 162 is removably attached in a suitable manner to a bracket 163 which is mounted on the housing 159 so that it is manually pivotable about the lead screw 52. A lock nut 164 on the housing 159 limits vertical play of the bracket 163; and a clamp 165 attached by a bolt to the base plate 1 fits over the outer lip of the bracket to lock it and the gears carried therewith in the desired pivotal position. The bracket 163 is slotted so that the spindle 162 can be moved radially with respect to the lead screw 52 in order to accommodate various sizes of gears 160. It is apparent that the gear 161 may also be easily changed.

Because of the pivotal movement of the bracket 163, there are three different ways in which the gear 161 can furnish power to the rest of the gear train. In the first way, which is the one illustrated in Figures 8, 10, and 24, the gear 161 engages a reverse gear 166 which is rotatably and removably mounted in a suitable manner, as indicated at 167 in Figure 24, to the base plate 1; and the gear 166 engages the drive gear 168 for the sun gear shaft 169. In the second way (not illustrated), the bracket 163 may be pivoted clockwise so that the gear 161 directly engages the drive gear 168. In this case the drive gear 168 will rotate in a direction opposite to that which it has when engaged by the reverse gear 166. In a third way, to be discussed hereinafter, the gear 161 engages an intermediary gear 234 (shown in Figure 30) which drives the cam table drive gear 215.

Figures 23, 26:
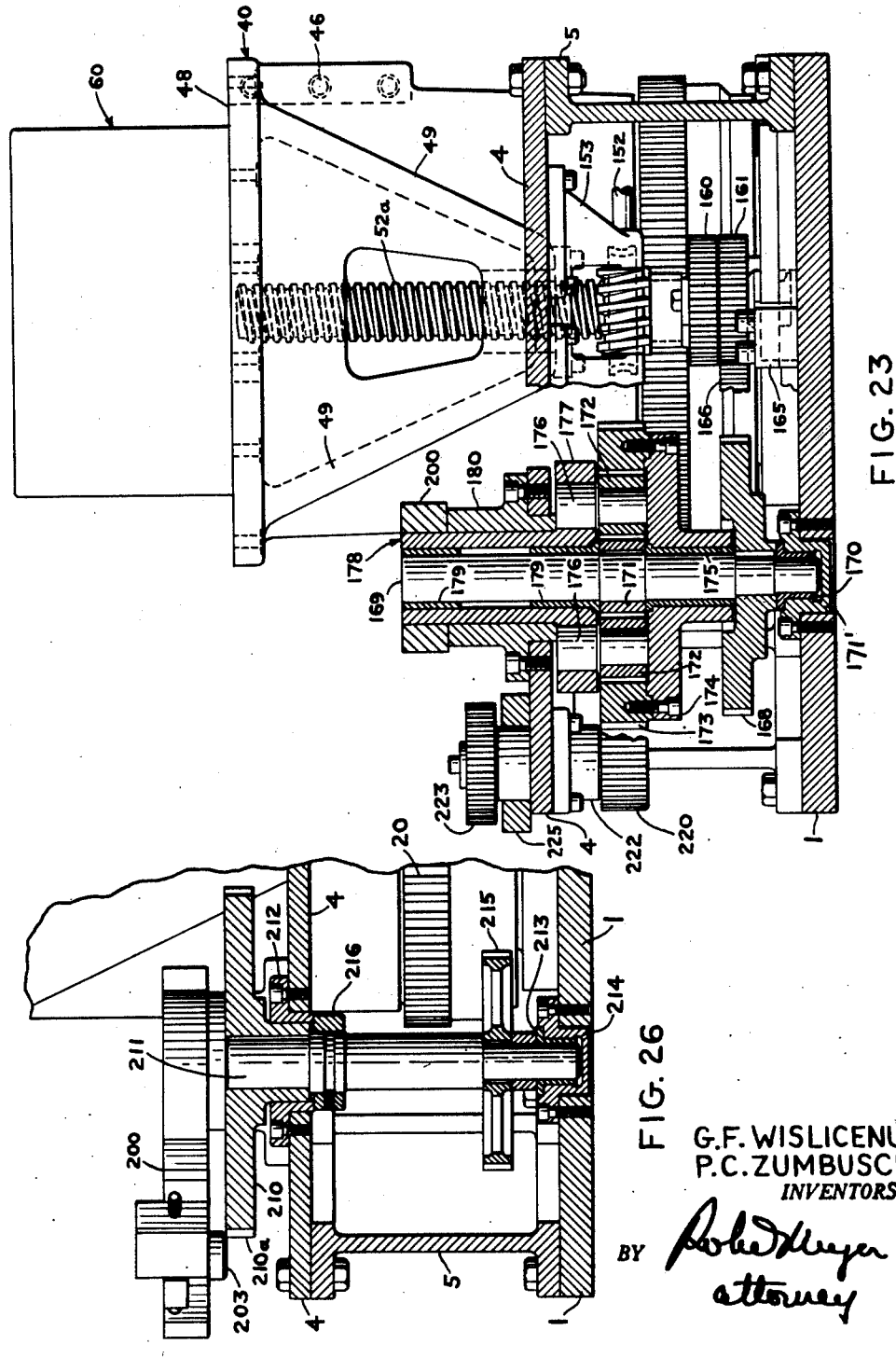
Figure 23 is a vertical section taken along the line 23—23 of Figure 10 and shows a portion of the gear train including the differential gear system.
Figure 26 is a vertical section taken along the line 26—26 of Figure 10 and shows the cam table arrangement.

As indicated best in Figures 8 and 23, the sun gear shaft 169 is driven by the drive gear 168 which, as just mentioned, is connected to the gear 161. The shaft 169 is rotatably carried by the bushing 170 in the housing 171' which is bolted to the base plate 1. The bushing 170 also serves as a thrust bushing for the gear 168. Spaced above the gear 168 is the sun gear 171 which is also fixed to the shaft 169. Two planet gears 172 engage the sun gear 171 and a ring gear 173 which is coaxial with the shaft 169. The ring gear 173 is bolted to a support disc 174 which is rotatably mounted on the bushing 175 which fits on the shaft 169 between the sun gear 171 and the drive gear 168. It is apparent that rotation of the drive gear 168 will be transmitted to the sun gear 171 which will rotate the planet gears 172, and that the rotation of the ring gear 173 is governed by the rotation of the planet gears 172.

The planet gears 172 are rotatably attached by pins 176 to the flange 177 of the tubular planet gear head 178. The planet gear head 178 has suitable bushings 179 to permit relative rotation of the shaft 169. The tubular portion of the gear head 178 is rotatably mounted in the flanged bushing 180 which is bolted to the cover 4.

Figure 25:
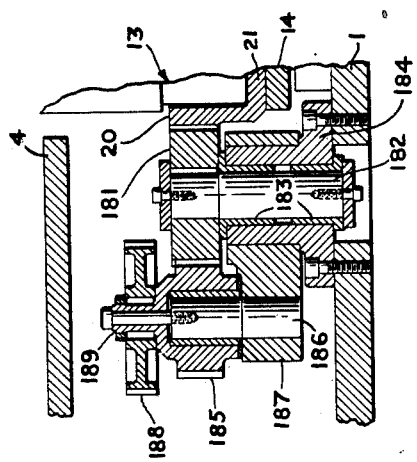
Figure 25 is a vertical section taken along the line 25—25 of Figure 10 and shows gears for driving the work table.

The work table ring gear 20, and thus the work table 13 is connected by a short train of changeable gears to the ring gear 173. As best illustrated in Figures 8 and 25, the gear 181 engages work table ring gear 20. The gear 181 is mounted on a spindle 182 which rotates in bushings 183 in the housing 184 which is bolted to the base plate 1. The gear 181 is driven by a stud gear 185 which rotates on a stud spindle 186 carried by the lever 187 which is pivoted on the housing 184. The stud gear 185 is rotated by a changeable gear 188 which is fixed thereto as shown at 189 and which is driven by the ring gear 173. The transmission ratio between the ring gear 173 and the work table ring gear 20 can be varied by changing gear 188. When this is done, the lever 187 is rotated to accommodate the change in diameters of the gears and locked in position by suitable clamp means (not shown) such as described in connection with bracket 163. In the gear set-up just described, the work table 13 rotates in a direction opposite to that of the ring gear 173. While not shown, it is obvious that by pivoting the lever 187 in a clockwise direction and inserting a gear between gears 188 and 173 that the work table may be made to rotate in the same direction as the ring gear 173.

Since the rotation of the work table 13 is directly dependent on that of the ring gear 173, it is apparent that work table rotation is likewise governed by the movement of the planet gears 172. In the structure so far discussed, the planet gears derive all of their motion from the sun gear 171 and, therefore, rotate about fixed axes. As a result, rotation of the ring gear 173 is in constant proportion to rotation of the lead screw 52; or, from the standpoint of relative motion between the impeller block A and the cutting tool 61, uniform increments of rotation of the block A correspond to uniform increments of axial motion of the cutting tool 61. It will be realized that this is the first part of the feed motion as mentioned above in the introductory paragraphs concerning the kinematic principles of the machine. Relative motion of this type will generate a helical impeller vane surface of constant pitch. However, for reasons outside the limits of the present discussion, most vane surfaces are not strictly helical but can be considered rather, as modified helical surfaces or helical surfaces of varying pitch. It is necessary, therefore, to provide means for altering the constant proportionality between the rotation of the work table 13 and the vertical or axial movement of the tool table 40.

This is accomplished in the illustrated embodiment of the invention by providing means for imparting orbital movement to the planet gears 172. The additional movement thus imparted to the planet gears, and consequently to the ring gear 173 and work table 13, is independent of the motion of the lead screw 52 so that constant proportionality between the vertical motion of the cutting tool and rotary motion of the impeller block A is not obtained. This additional movement is the second part of the feed motion and is controlled by a cam B to meet the specific requirements of the surface desired. It is to be noted that the invention is not limited to the planetary gearing illustrated but that other types of differential means may obviously be employed to perform the function just outlined.

As clearly shown in Figures 8 and 23, the planet gears 172 are pinned to the flanged, rotatable gear head 178 so that movements of the latter will alter the orbital movement of the planet gears 172 and modify the helical relationship between the work table movement and the cutting tool movement. The gear head 178 receives the necessary additional movement from the cam follower 200 which is locked to the gear head 178 by means of the split 201 and clamp bolt 202.

At the end opposite to that which is pivotally connected to the shaft 169 by means of the gear head 178, the cam follower 200 carries a cam roller 203 which engages the inner or outer circumference $b$ of a flat plate cam B (Figures 8 and 9) which is rotated by means to be described hereinafter. The distance between the axis of the roller 203 and the axis of the shaft 169 is, for the sake of convenience in laying out the cam B, made equal to the distance between the axis of shaft 169 and the center of rotation 211 of the table upon which the cam rotates.

Means are, of course, provided for holding the roller 203 in continuous contact with the cam surface $b$. The preferred form of this means will be described in connection with Subassembly D.

It may be mentioned at this point that when the cam surface $b$ is circular and coaxial with its axis of rotation, there will be no deflection of the follower 200, and, as a result, the rotation of the work table 13 will bear a constant ratio to the vertical travel of the tool table 40. Thus, with a circular cam, a true helical surface will be generated. In order to generate a helical surface of varying pitch, the follower 200 must have some pivotal movement about the shaft 169. This occurs only when there are variations in the radii of points on the cam surface $b$ with respect to the cam's center of rotation. These variations in the radii are, of course, determined by conventional methods of cam layout which take into consideration the departures of the helical surface to be generated from a true helical surface and the transmission ratios involved. This topic will be discussed again, hereinafter.

Figure 9:
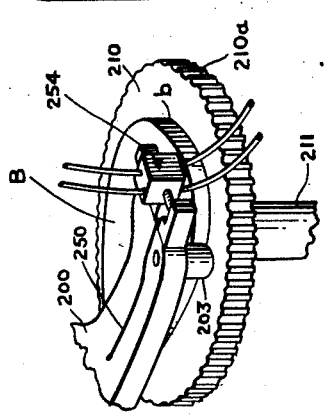
Figure 9 is a perspective view, with parts removed, taken from the left of Figure 8 and shows the cam follower engaging the outer periphery of the cam.

The cam B is attached by suitable means (not shown), such as bolts, to the cam table 210, precautions being taken to insure strict coaxiality of the cam B with the table 210 and congruity of radial reference lines (not shown) on the cam B and the table 210. The table 210 preferably has gear teeth 210a cut in its outer periphery as shown in Figures 8, 9, and 26. The table 210 is keyed to a shaft 211 which is rotatably mounted in a bushing 212 bolted to the cover 4 and a bushing 213 in the housing 214 which is bolted to base plate 1. Spaced above the bushing 213 is a drive gear 215 which is also keyed to the cam table shaft 211. A lock ring 216 is fixed to the shaft 211 so that it abuts the lower end of the bushing 212 to prevent upward vertical play of the shaft 211.

It is clear that the cam table 210, because of its peripheral gear teeth, may also function as a gear 210a to drive itself or that it may be driven by the gear 215 through the shaft 211. With the structure illustrated, these alternative cam table gears provide four general gear set-ups since there are two practical ways to drive the gear 210a and two practical ways to drive gear 215. The four gear set-ups and their distinguishing features may be briefly described as follows:

(1) The gear 210a is driven by the ring gear 173, (2) the gear 210a is driven by the drive gear 168; (3) the gear 215 is driven by the gear 168, and (4) the gear 161 drives gear 215 instead of gear 168.

Figure 27:
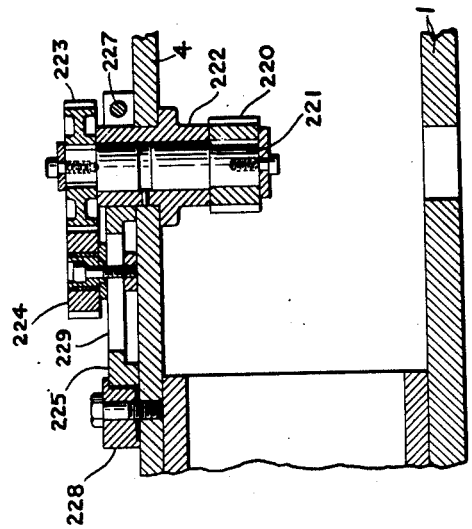
Figure 27 shows gear set-up (1) for driving the cam table and is a vertical section taken along the line 27—27 of Figure 10.
Figure 24:
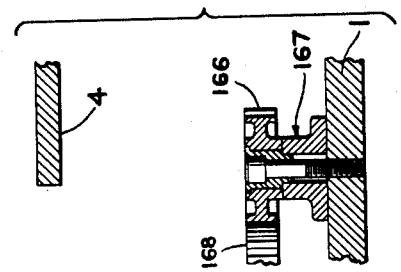
Figure 24 is a vertical section taken along the line 24—24 of Figure 10 and shows the removable reversing gear.

In set-up (1), illustrated in Figures 8, 10, and 27, rotation of the cam table 210 is proportional to rotation of the work table 13. The gear 220 engages the ring gear 173. Gear 220 is attached to a shaft 221, which is suitably carried by the bushing 222 bolted to the cover 4, and drives the gear 223 also removably attached to the shaft 221. The gear 223 drives a gear 224 which is rotatably mounted on the bracket 225 and which engages the cam table gear 210a. The bracket 225 is very similar to bracket 163, previously described, but has a split 226 and bolt 227 by which it is clamped to the upper end of the bushing 222. A clamp 228 is provided to lock the bracket 225 to the cover 4. The gear 224 is mounted in a slot 229 in the bracket 225 so that it may be moved radially with respect to shaft 221. The radial movement of the gear 224 and the pivotal movement of the bracket 225 about the shaft 221 obviously permits the gear 223 or 224 to be changed so as to obtain desired transmission ratios.

In set-up (2), illustrated in Figure 28, the shaft 221a is carried by a bushing 230 in the housing 231 which is bolted in the base plate 1. Instead of the gear 220, the shaft 221a has a gear 232 suitably fixed thereto which meshes with the sun gear shaft drive gear 168. Motion is transmitted from shaft 221a to the cam table gear 210a in the same manner as described for set-up (1). In this set-up, however, cam table rotation is proportional to lead screw rotation.

Set-up (3) is shown in Figure 29, and the cam table rotation is proportional to the lead screw rotation and hence to vertical movement of the tool table 40. In this case a gear 233 is suitably mounted on the base 1 and directly connects the drive gear 168 to the cam table drive gear 215 inasmuch as the two drive gears are the same distance above the base plate 1.

In set-up (4), illustrated in Figure 30, cam table rotation is proportional to vertical movement of the tool table 40. The gear 234 is suitably mounted on the base plate 1 and connects the gear 161 to the cam table drive gear 215. The drive gear 168, and thus the ring gear 173 and work table 13, are not rotated by power from the lead screw shaft 52. Lost motion is prevented either by bolting the gear 168 to the base plate 1 or by locking the gear head 178 to the ring gear 173. In this set-up the only rotary motion imparted to the work table 13 and impeller block A comes from the cam B acting through the follower 200 and the ring gear 173. If there is no cam, or the cam B is circular, then the only relative generating motion between the impeller block A and the cutting tool 61 will be the vertical motion of the tool (ignoring possible radial feed of the tool). As a consequence, the generated surface will lie in planes through, or parallel to, the impeller axis and, hence, will be a cylinder.

The particular gear set-up to be used depends upon the general ratio of the relative peripheral and axial motions required to produce the desired vane surface. If this ratio is large, that is, if the vane is very flat, then set-up (1) is used. It should be noted, however, that set-up (1) cannot be used if the work table 13 has to reverse its direction of rotation. Set-ups (2) and (3) are functionally the same and differ only in structural means for accomplishing that function. These set-ups are the ones usually employed since they are good for all but very large or very small values of the relative motion ratio; or, in other words, these set-ups are good for all except extremely flat or extremely steep vanes. Set-up (4), as indicated in the preceding paragraph, is used for extremely steep vanes.

It has already been discussed at some length how the gear train connecting the lead screw 52 to the work table ring gear 20 establishes a basic ratio between the axial and rotary components of the feed motion and how this ratio may be varied to suit the requirements of the desired surface by means of the cam B and the planetary type of differential gearing which forms a part of the gear train. It is possible by changing other gears to vary the absolute dimensions of the surfaces produced without changing the cam and to vary, within limits, the geometry of the surface produced without changing the cam.

The gears just referred to are the changeable gears such as 160 and 161 (between the lead screw 52 and the ring gear 173, Figures 8 and 11) and the gear 188 (between the ring gear 173 and the work table ring gear 20, Figures 8 and 25). By changing these gears the first part of the feed motion or the basic ratio between the axial and rotary components of the feed motion may be varied. Changing gears, such as 160 and 161, between the lead screw 52 and ring gear 173 will modify the vertical or axial component of the feed motion of the cutting tool 61 with respect to the impeller block A. Changing gears, such as 188, between the ring gear 173 and the work table ring gear 20 will modify the rotary component of the feed motion. It is clear that the axial and rotary components of the feed motion can thus be changed individually by any desired ratio within the structural limits of the machine. If both motions are changed in the same ratio, the basic ratio therebetween will remain constant and the net result will be to increase or decrease the feed motion and, therefore, to change the absolute size of the vane without changing its geometric form. On the other hand, a change in the geometric form, or steepness of the vanes, can be obtained by changing either the axial component or the rotary component alone or by changing each in different ratios. Obviously, all these changes can be made without changing the cam.

Those skilled in the art will recognize another desirable feature of the structure just described. It permits the use of the peripheral plate type of cam which is much more easily made than the cylindrical type of cam often employed in generating machines.

Figure 31:
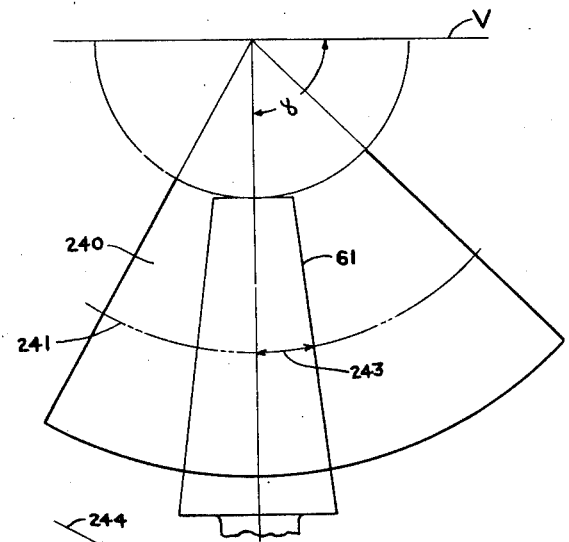
Figure 31 is a plan view of a vane surface which may be generated by a machine according to the invention.
Figure 32:
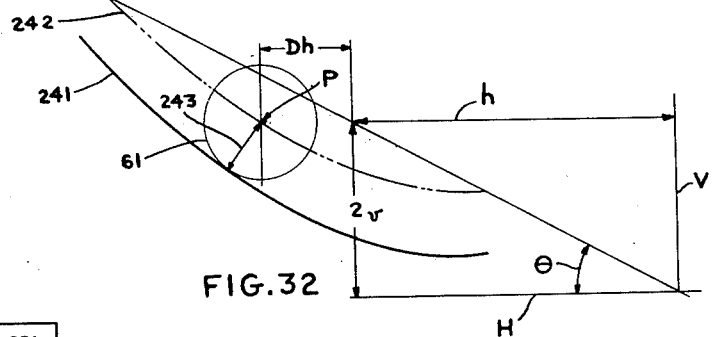
Figure 32 is a cylindrical section of the vane surface of Figure 31 taken along the line 241 thereof.

The engineering set-up of the machine to generate a desired vane surface is facilitated by drawings such as shown in Figures 31 and 32. Figure 31 shows a vane surface 240 which is assumed to have parallel radial sections of a given slope so that it is defined by the cylindrical section 241. Section 241 is developed in Figure 32.

In the suggested method for setting up the machine to generate the vane surface 240, the first step is to find the base helix (corresponding to the first part of the feed motion). To do this, the path 242 of the center of the cutting tool 61 is laid out. If the tool has no radial motion with respect to the impeller (motion along the axis of the tool), then the path 242 will be parallel to the developed section 241 at a distance from it equal to the radius 243 of the cutter at the cylindrical section 241. This is the case in Figure 32. The path 242 must be of sufficient length so that the cutter will clear the edges of the vane. A developed base helix 244, which is, of course, a straight line, is drawn so that it approximates as nearly as possible the cutter center path 242. The base helix 244 makes a helix angle $\theta$ with an arbitrary horizontal reference line or axis H. An arbitrary vertical reference line or axis V is drawn through the intersection of line 244 and the line H. Line V may be considered as the trace of a vertical radial plane V and its trace in Figure 31 may then be used as a reference line to designate the angular position of points on the vane surface. It is clear that the horizontal coordinate $h$ of a point on the developed section 241 is the rectified length of the curve struck off in the undeveloped section 242 by the angle $\gamma$.

The second step in the engineering set-up is to determine the overall transmission ratio to give the base helix 244. It has been apparent in the detailed discussion of the gear train that provision is made for easily changing many of the gears in order to vary this overall ratio as well as the local ratios. When the overall ratio to generate the base helix is determined, these change gears can be tentatively selected. It is apparent from Figure 32 that this ratio is that of the vertical coordinate $v$ of a point on the base helix 244 to the horizontal coordinate $h$ of that point. This is also equal to the tangent of the base helix angle $\theta$.

The third step is to find the required local ratio between the sun gear 171 and the work table ring gear 20 so that the cam follower 200 within its limit of pivotal motion $\beta$ about the axis of shaft 169 will be able to cause the maximum required deviation $Dh$ of the rotation of the work table from the base helix. This ratio $k_1$ equals $\beta/\gamma_D$ where $\gamma_D$ is the angular deviation corresponding to the horizontal deviation $Dh$. With $k_1$ known, gear 188 can be selected.

The fourth step is to find the local ratios required to turn the cam table 210 through an angle $\Delta$ while sufficient relative motion occurs between the work table 13 and the cutter 61 to generate the complete vane surface. In set-up (1) this ratio $k_2$ equals $\Delta/\gamma_s$ where $\gamma_s$ is the angle of rotation of the work table sufficient for the cutter to clear the vane edges. For set-ups (2), (3), and (4) the rotation of cam table 210 is proportional to the vertical travel of the cutter so that the ratio $k_3$ equals $\Delta/W$ where $W$ is the vertical movement required to generate the vane surface. The angle of rotation $\Delta$ of the cam table 210 is preferably arbitrarily selected in the neighborhood of 270 degrees. The ratio $k_2$ may be used with the ratios determined in steps (2) and (3) to select gears 223 or 224 in set-up (1). The ratio $k_3$ may be used with the information determined in step (2) to determine for set-up (2) the gears 223, or 224; for set-up (3) the gears 233, 160, 161, and 166; and for set-up (4) the gears 234, 160, and 161.

The fifth step in the engineering set-up of the machine is to lay out a cam surface $b$ which will influence the cam follower 200 to properly vary the relative motion between the cutter 61 and the impeller block A from the basic helical motion. In laying out the cam B each point P on the cutter path 242 is considered as having three "coordinates," viz., (1) the angular position $\gamma_p$ of the work table 13 with respect to the reference plane V, (2) the angle $\beta_{p/2}$ between the cam roller 203 and the line joining the centers of shafts 169 and 211, and (3) the angular position $\Delta_p$ of the cam table 210 with respect to some reference plane corresponding to V. These "coordinates" are related by the ratios determined in the preceding steps. With this information and with the diameter of the cam roller 203 and the distances between the axes 203 and 169 and the axes 169 and 211 known, it will be apparent to those familiar with cam design that the cam B may be determined. The cam surface $b$ thus obtained should be developed to see if the curve is smooth as this is essential to a smooth vane surface.

A sixth step is required when the impeller hub is not cylindrical. This is to adjust the length of the rod 95 and its radial position with respect to the rocker shaft 96 as discussed previously.

*Subassembly D*

In order to accomplish the main objects of this invention, namely, to produce quantity lots of vanes having smooth and accurate surfaces, it is necessary that the cam roller 203 be held in continuous contact with the cam B and that movements of the cam follower 200 be precisely transmitted to the work table 13. The cam roller 203 could, of course, be held against the cam B by one of the usual types of resilient or yieldable means employed for such purposes, such as a spring or an air cylinder. However, in the preferred embodiment of the invention, this is accomplished by means to be presently described which forces the roller 203 to ride on the cam surface $b$ with a substantially constant pressure and which also insures unerring transmittal of cam signals by "winding up" the gear trains to counteract back lash and sloppiness therein.

The means just mentioned utilizes as an actuating medium the torque reaction from the gear trains on the cam follower 200 which "urges" the latter to rotate about the axis of shaft 169. When the moment of the follower about shaft 169 reaches a predetermined value, it actuates a motor 370, geared directly to the work table ring gear 20, which furnishes power to rotate the work table 13 in the desired direction. Since this power supply is independent of (and acts in the same direction as) the power system which includes the motor 150, the lead screw 92, and the gear trains, it opposes the characteristic tendency of the gear train to lag and err in response and, in ultimate effect, makes the work table 13 very accurately sensitive to cam signals.

Figure 33:
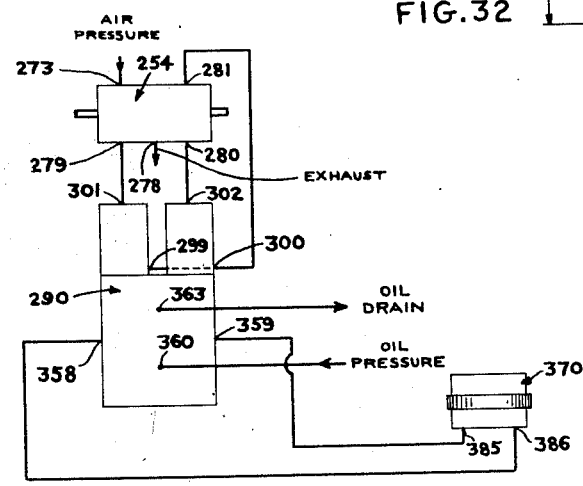
Figure 33 is a circuit diagram of subassembly D.

While it will be understood that it is not intended to limit this feature of the invention thereto, the specific structures comprising one form of the means, or circuit, generally described in the preceding paragraph are illustrated in Figures 34–38. In this circuit the "urge" of the cam follower 200 to rotate about the shaft axis 169 is measured in terms of the variation in width of a slit 250 in the cam follower 200. As clearly shown in Figures 8 and 34, the slit 250 is started in the roller end of the follower, extends over a major share of the length of the follower, and is placed so that it divides it into the leg 200a, containing the roller 203, and the leg 200b. A pneumatic valve 254 is arranged to detect incipient variations in the width of slit 250. When variations begin, the valve 254 is energized and actuates one side or the other of a two-day flow direction control valve 290 depending upon whether the slit increased or decreased in width. As schematically shown in Figure 33, the hydraulic control valve 290 directs oil, delivered thereto by a suitable pump (not shown), to a hydraulic motor 370 geared to the work table 13. The motor 370 is thus caused to rotate in either a clockwise or counter-clockwise direction depending upon which side of the valve 290 was actuated.

As shown in Figure 34, the leg 200a has an extension 251 rigidly attached by suitable means to its outer end. The extension has an indicator finger 252 which is transverse of the slit 250. The finger 252 may comprise a bolt as shown. The leg 200b has an extension 253 to which the pneumatic valve 254 is suitably attached as by the bolts 255. The valve 254 has a valve spool 256 with ends projecting outside of the valve housing. One end 256a is coupled to the finger 252 as shown at 257. Since the finger 252 and the valve spool 256 are rigidly fixed to the follower leg 200a and the valve body 254 to the leg 200b, contraction or expansion of the slit 250 will cause the valve spool 256 to move in the valve body. A dial indicator 258 for indicating the valve movement may be attached to the extension 253 so that its stem abuts the end 256b of the valve.

Figure 35 shows the construction of the valve 254. Its housing consists of the complementary blocks 259 and 260. Each of these blocks has a central cylinder 261 for the spool 256 and each is machined so as to have an annular valve seat 262 at the inner ends of their respective cylinders 261. As clearly shown in the drawings, the inner end of the block 259 is substantially reduced in diameter so as to provide an annular end surface 263 and an outer annular shoulder 264 for engagement with the block 260. The inner end of the block 260 is annularly recessed at 265 to provide an annular chamber 266 and a surface for engaging the shoulder 264 of the block 259. The two blocks are fastened together by bolts, including bolts 267, so that the cylinders in each are in alignment. The valve spool 256 has annular bearing surfaces or flanges 268 and 269 near each end which slidably support the valve in the cylinder 261 in the usual manner. The central annular surface 270 of the valve 256 is of slightly larger diameter than the cylinder 261 or lands 268 and 269 and fits in the annular chamber 266. The surface 270 has annular seating surfaces 271 for engaging the valve seats 262 in each of the blocks. It will be noted that the valve seats 262 and the surface 271 are tapered in opposite directions. This feature provides substantially line contact between the seats 262 and the valve surface 271. It will also be noted that the depth of the recess 265 is such that the width of the chamber 266 between the valve seats 262 is substantially the same as the width of the valve surface 270. Consequently, the amount of axial movement which the valve is permitted to have, or its stroke, is equal to the thickness of the gasket 272 between the abutting inner ends of the blocks 259 and 260. The gasket thickness is selected so that the order of magnitude of the valve stroke is about that of the anticipated variations in width of the slit 250 due to external forces acting on the follower 200. As a result, there is little likelihood of the valve 256 occupying a position in which it is not seated in either block 259 or 260.

Air under pressure, from a suitable source (not shown) is admitted to the valve at the inlet 273 in the block 259. The inlet 273 leads directly into the annular chamber 274 formed by the valve lands 268 and 270 in the cylinder 261. A lateral passageway 275 is formed in both blocks 259 and 260 to conduct air from the inlet 273 to the annular chamber 276 formed by the cylinder 261 and the lands 269 and 270 on the valve 256. Two identical orifices 277 are suitably fixed at the entrance ports to the chambers 274 and 276. They serve to provide uniform distribution of incoming air and to provide means for regulating the rate of pressure build up in the chambers 274 and 276. A passage 278 connects the annular exhaust chamber 266 to the atmosphere. Consequently, when the slit 250 is compressed and the valve flange 270 is seated in block 260, the annular space 274 will be connected to atmosphere and pressure in space 276 will build up almost to that of the incoming air. When the slit 250 is expanded, the valve flange will seat in block 259 so that pressure in chamber 276 will drop and pressure in chamber 274 will rise. The chamber 274 has an outlet 279 which is connected to the oil control valve 290, to be presently described, and chamber 276 has an outlet 280 also to be connected thereto. An outlet 281 for the passage 275 is also connected to the oil control valve. The open outer ends of the cylinder 261 are sealed by flexible gaskets 282. The gaskets are clamped by annular washers 283 and 284 and bolts 285 to the outer ends of the blocks 259 and 260 and to shoulders 286 on the valve 256 just outward of the lands 268 and 269.

To sum up, the pneumatic valve 254 transforms variations in the width of the slit 250 into pressure variations between the chambers 274 and 276. These pressure variations are not, in general, variations in the magnitude of the pressure difference between the two chambers but consist, rather, in reversals of line pressure and atmospheric pressure between the two chambers. As a consequence, the signals sent by the valve 254 to the valve 290 are merely directional, indicative of compression or expansion of the slit 250 but not, in general, of the amount of such compression or expansion.

The impulses from the valve 254 are sent by suitable conduit means to the two way flow direction control valve 290, which is shown in Figure 36. It consists of a pneumatic section 290a and a hydraulic section 290b. The pneumatic section 290a includes two identical valve arrangements 291 and 292. Section 291 has a housing 293 and section 292 has a housing 294. The housings have central cylindrical chambers 295 and 296, respectively and covers 297 and 298 therefor. Ports 299 and 300 in the housings admit air from outlet 281 of the pneumatic valve 254 to the bottoms of chambers 295 and 296, respectively. Ports 301 and 302 in the covers 297 and 298 of the chambers 295 and 296 are connected by suitable conduit means to the outlets 279 and 280 of the pneumatic valve chambers 274 and 276, respectively. Axially disposed within the chambers 295 and 296 are the pistons 303 and 304. The pistons have stems 305 and 306 respectively which slidably extend down through the bottom of the chambers 295 and 296 and make the bottom pressure surfaces 307 and 308 of the pistons of lesser area than the top pressure surfaces 309 and 310. As shown, the nibs 311 on the top of surfaces 309 and 310 and the washers 312 at the bottoms of chambers 295 and 296 prevent the pressure surfaces from engaging the top or bottom ends of the chambers.

As indicated, line air pressure from outlet 281 of valve 254 acts on the bottom lesser area pressure surfaces 307 and 308. Pressure from chamber 274 acts on the top pressure surface 309 and pressure from chamber 276 acts on the top pressure surface 310. In the drawing it is apparent that the total line pressure on the piston 303 is greater than the force exerted by the air from chamber 274 since the piston 303 abuts the top 297 of its chamber 295. The reverse is the case for piston 304. It will be seen that this arrangement of the valves occurs when the slit 250 is compressed, seating the valve 256 in the block 260 and exhausting the air in the chamber 274. In view of the nature of the previously discussed valve 254 and the differences in the areas of the pressure surfaces of each of the pistons 303 and 304, the pistons are hydraulically unbalanced and will not, in general, reach equilibrium positions intermediate the extreme up and down limits of their travel.

The lower hydraulic section 290b of the control valve 290 has a housing 315 and a bottom cover 316 therefor. The housing 315 has two laterally spaced valve cylinders 317 and 318. As will soon be apparent, the cylinders and the parts therein are identical. A set of three axially spaced annular chambers 319, 320, and 321 open into the cylinder 317; and the cylinder 318 has an identical set of chambers 322, 323 and 324. Flanged valve sleeves 325 and 326 are pressed into the cylinders 317 and 318, respectively. The valve sleeve 325 has openings 327 into the chamber 319, openings 328 and 329 into the chamber 320, and openings 330 into the chamber 321. The valve sleeve 326 also has similar openings 331 into chamber 322, 332 and 333 into chamber 323, and openings 334 into chamber 324. A valve spool 335 is slidably fitted in the sleeve 325 and a replica 336 is slidably fitted in the sleeve 326. The valve 335 has four axially spaced flanges or lands 337, 338, 339, and 340 and the valve 336 has the flanges 341, 342, 343, and 344. The annular space 345 lies between flange 337 and 338, space 346 between flanges 338 and 339, and space 347 between flanges 339 and 340. The corresponding annular chambers for the valve 336 are 348, 349, and 350. The stem of valve 335 is partially hollow to form a chamber 351 which has openings 352 into chamber 345 and openings 353 into chamber 346. The valve 336 has an internal chamber 354 with openings 355 into chamber 348 and 356 into chamber 349. Opposing pressure surfaces on each valve spool are of the same area so that the valves are hydraulically balanced.

The pilot valve section 290a actuates the hydraulic valve section 290b. As clearly shown in the drawing, the valve section 291 is bolted or otherwise suitably attached to the housing 315 as is the section 292. Section 291 is coaxial with the housing cylinder 317 and section 292 is coaxial with the cylinder 318. The piston 303 is suitably attached, as by the stud 357, to the valve 335 and the piston 304 is similarly attached to the valve 336. It is thus clear, in view of the description of valve section 290a, that variations in the width of the slit 250 by energizing the valve 254 will, through the resulting vertical movements of the pistons 303 and 304, effect vertical sliding movement of the hydraulic valve spools 335 and 336.

Movement of the valve spools 335 and 336 controls the direction of oil flow to the motor 370. Oil to rotate the motor 370 in one direction leaves the cylinder 317 through an outlet 358 in the annular motor chamber 320; and oil to rotate the motor 370 in the opposite direction leaves the cylinder 318 through an outlet 359 in the annular motor chamber 323. Oil from a suitable source such as a pump (not shown) is admitted to the cylinder 317 through inlet chamber 319 and to cylinder 318 through inlet chamber 322, both of these chambers being connected to the same oil inlet 360 by the lateral passage 361. In cylinder 317 oil from the inlet chamber 319 flows through openings 327 in the sleeve 325 into the annular space 345, and from space 345 through openings 352 into the hollow valve stem chamber 351. Up to this point the flow is always the same, regardless of the position of the valve 335. Similar flow occurs in the corresponding structure associated with valve cylinder 318. Flow through the remainder of the circuit, however, is affected by the positions of the valves 335 and 336 which are not stationary except in their two extreme and limiting positions, up or down. The positions of their respective flanges 339 and 343 in the up and down positions are as follows: Up—the flange 339 covers openings 329 in the sleeve 325 and the flange 343 covers openings 333 in sleeve 326. Down—the flange 339 covers the openings 328 in the sleeve 325 and the flange 343 covers the openings 332 in the sleeve 326. In Figure 36, valve 335 is in the up position and valve 336 is in the down position. It is, therefore, rather clear that oil will flow from the hollow valve chamber 351 in valve 335 through the openings 353 into annular space 346, from space 346 through openings 328 into the annular motor chamber 320. Since the other openings 329 of the sleeve 325 into the motor chamber 320 are covered by the flange 339, oil will be forced through the outlet 358 to the motor 370. On the outer side of the valve section 290b, oil flowing into the hollow valve chamber 354 in valve 336 may flow out into the annular space 349 through openings 356, but it is trapped there since the flange 343 covers the openings 332 which are the only possible outlets therefor.

As will become hereinafter apparent, when the motor 370 is actuated to move in one direction by a quantity of oil flowing in one side, an equal quantity of oil is drained from the other side of the motor. The oil going to the tank or drain passes through the valve 290b. In the particular set-up of Figure 36, oil flows to the motor from the left side of the valve through outlet 358, so an equal amount of oil must be returned by the motor 370 to the right side of the valve through outlet 359. This oil enters motor chamber 323, passes through sleeve openings 333 into the annular space 350, and from there through sleeve openings 334 into the annular drain chamber 324. If the valves were arranged so that valve 335 was down and valve 336 was up, then oil would be returned to cylinder 317 from the motor through the outlet 358. In this case oil would pass from the motor chamber 320 through openings 329 in the sleeve 325 to the annular space 347, and from space 347 through sleeve openings 330 into the annular drain chamber 321. The drain chambers 321 and 324 are joined by the lateral passage 362. Passage 362 has an outlet 363 which is suitably connected to a sump (not shown) so that oil will flow to the sump from the chambers 321 and 324.

The lateral passage 364 in the cover 316 connecting the bottoms of cylinders 317 and 318 and the lateral passages 365 in the flanges of sleeves 325 and 326 are connected to a suitable hydraulic damping device (not shown) to prevent locking and fluttering of the valve spools.

From the foregoing description it appears that when the slit 250 increases in width, the right side valve 336 will be up and the left side valve 335 will be down. Oil will flow from right outlet 359 to the motor and to left outlet 358 from the motor. When the slit 250 decreases in width, the arrangement of Figure 36 will be obtained and the left side valve 335 will be up and the right side valve 336 will be down. Oil will flow from the left outlet 358 to the motor and to the right outlet 359 from the motor.

Figure 38:
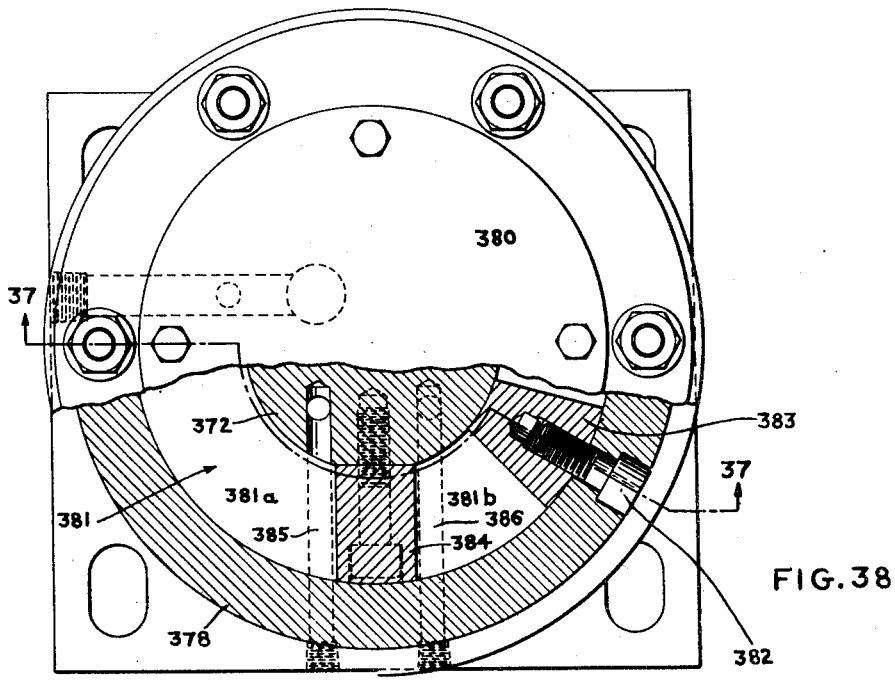
Figure 38 is partly a plan view of the hydraulic motor of Figure 37 and partly a horizontal section taken along the line 38—38 of Figure 37.
Figure 37:
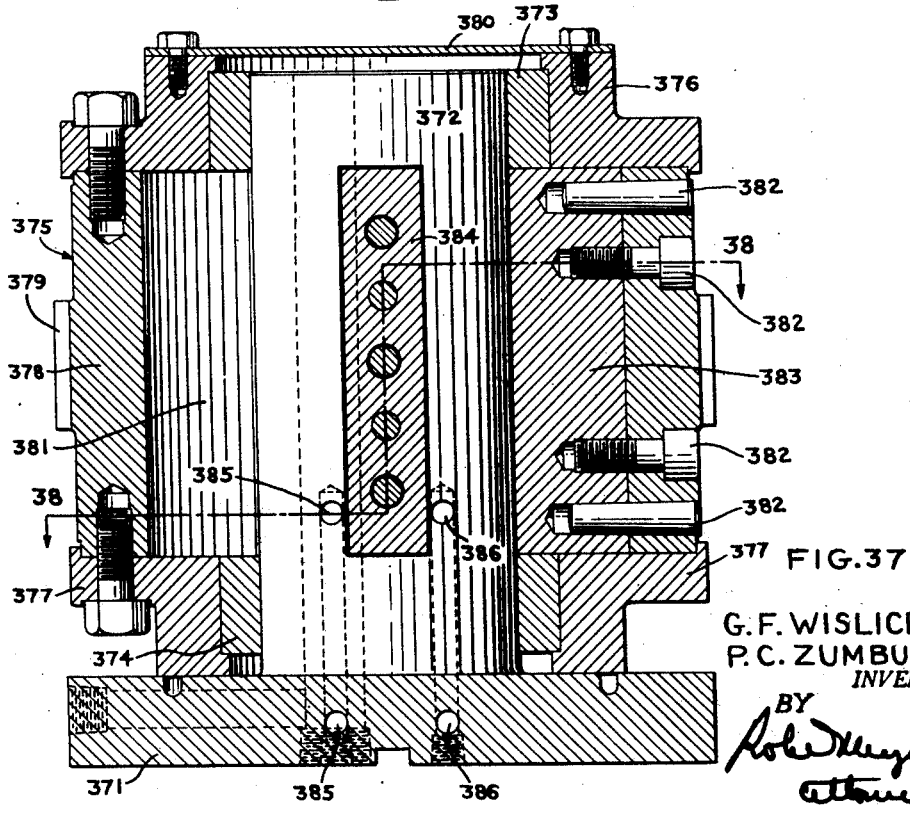
Figure 37 is a vertical section of the hydraulic motor taken along line 37—37 of Figure 38.

The motor 370, which is connected by suitable conduit means to the hydraulic valve 290b, is shown in Figures 37 and 38. It has a base plate 371 to which is suitably fixed a central column 372. The column 372 has bushings 373 and 374 adjacent its upper and lower extremities whereby it rotatably carries the motor housing 375. The motor housing 375 may, as shown, be composed of annular upper and lower plates 376 and 377 bolted to a cylindrical section 378 which is of considerably greater inner diameter than the column 372. The annular plates 376 and 377 are mounted on the bearings 373 and 374. The cylindrical section 378 has external gear teeth 379 which are adapted to engage the work table ring gear 20. A cover plate 380 is attached to the top of plate 376. As clearly appears in the drawings, there is an annular chamber 381 bounded by the inner ends of the bushings 373 and 374 and plates 376 and 377 and by the inner diameter of the cylinder 378 and the outer surface of the column 372. Fitted to the walls of the chamber 381 and suitably fixed, as by bolts and pins 382, to the cylindrical section 378 is a radial edged vane 383. Also fitted in the chamber 381 but fixed to the column 372, is a stop plate 384. The oil passages 385 and 386 in the base plate 371 and column 372 open into the chamber 381 on either side of the stop plate 384. The passages are connected by suitable conduit means to the outlets 358 and 359 of the valve 290b. It is clear that the stop plate 384 and vane 383 subdivide the chamber 381 into two chambers 381a and 381b which vary in volume according to the position of the vane 383. Chamber 381a is connected to oil passage 385 and chamber 381b is connected to oil passage 386. When pressure is admitted through oil passage 386, the vane 383 and attached housing 375 will rotate in a counter-clockwise direction increasing the volume of chamber 381b and decreasing the volume of chamber 381a so that oil in the latter chamber will be forced out through oil passage 385 and back to the oil valve 390b. When pressure is admitted through passage 385, reverse flow occurs and the housing and gear 379 are rotated in a clockwise direction. It is clear that the gear 379 has a maximum rotation of approximately 360 degrees in either direction.

It will be recalled that the inherent function of the circuit just described is to hold the cam roller 203 on the cam surface with a substantially constant pressure. However, in accomplishing this, the circuit also performs the very important incidental functions of "winding up" the gear trains and of reducing the forces thereon. These features are discussed in connection with Figures 39 and 40.

Figure 39:
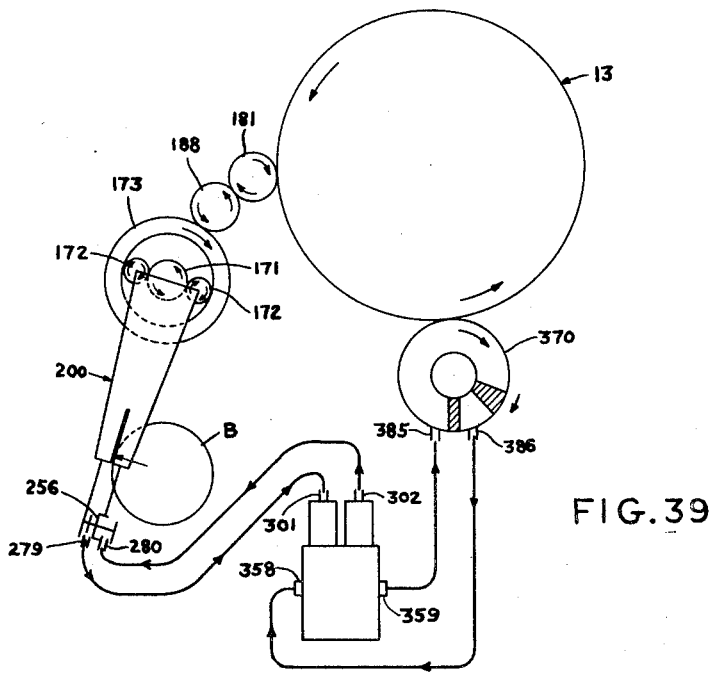
Figure 39 is a schematic diagram of the circuit of subassembly D during counterclockwise rotation of the work table.
Figure 40:
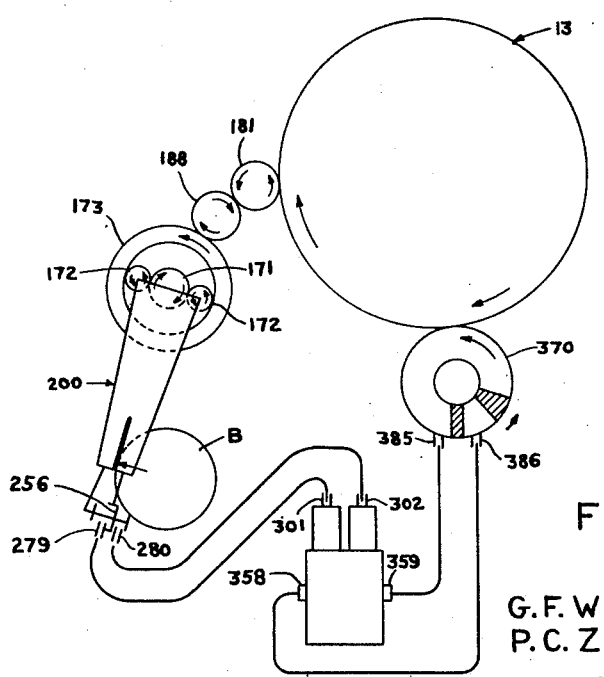
Figure 40 is similar to Figure 39 but shows the circuit when the work table rotates in a clockwise direction.

In Figures 39 and 40 the cam B has an outer peripheral cam surface and the work table rotates in a direction opposite to that of the ring gear. Before the sun gear 171 or cam table 210 is rotated, the follower arm 200 is actuated so that the cam roller will be held against the cam surface with a predetermined pressure. This is done by coupling the finger 252 to the valve spool 256 so that the spool is seated in the right side of valve 254 or block 260. (For an inner periphery cam the valve would be seated in block 259.) Thus, when the follower arm 200 is unstressed and the slit 250 is its machined width, the valve 256 is seated in block 260. In view of the previous discussion of the circuit it is clear that this will actuate the motor 370 to move in clockwise or counter-clockwise, depending upon its hook-up with the hydraulic section 290b of the valve 290. The follower arm 200 must rotate in a counter-clockwise direction in order to place the roller on the cam. To obtain this with the gearing shown, the motor 370 must also rotate in a counter-clockwise direction when the valve 256 is seated in block 260. This relationship is obtained when the left outlet 358 of the valve 290b is connected to the right oil passage 386 of the motor 370 and the right outlet 359 to the left oil passage 385. Since the motor is actuated by this initial biasing of the valve 256 to seat in block 260, it will force the roller against the cam surface in an effort to increase the width of slit 251 and thereby unseat the valve 256. Reactions to this can be considered as the stress in the follower arm 200 or the pressure on the cam either of which attempt to hold the slit at its original width and thus the valve 256 seated in block 260. It will be seen that this is the state of equilibrium for the system and that any incipient variations in the slit width will energize the valve 254 so that the motor 370 will instantaneously counteract them. As a consequence, the cam roller will be continuously held against the cam surface with a substantially constant pressure. Furthermore, there will be a continuous stress in the gear system tending to make it keenly sensitive to movements of the follower arm so that, in effect, the gear system is "wound up" for precise transmittal of cam signals.

The motor 370 always acts to drive the work table in the direction ordered by the cam. For example, in Figure 39 the work table rotates in a counter-clockwise direction. So long as the cam B actuates the follower to cause variations from a helical motion which are likewise in a counter-clockwise direction, the torque reaction from the work table on the follower 200 will, with the illustrated gearing, be counter-clockwise. This will tend to force the roller against the cam with an increased pressure and thus to increase the width of the slit 250. The slit variations, however, are immediately picked up by the valve spool 256 which then seats in block 259 thus causing clockwise rotation of the motor 370. The motor 370 then drives the work table in the counter-clockwise direction indicated by the cam B. This reduces the torque reaction on the follower arm and the slit returns to its width as determined by the mechanism of Figure 39. In the case in which the work table rotates in a clockwise direction, as shown in Figure 40, the torque reaction on the follower is clockwise. This will reduce the force pressing the roller against the cam and the slit will return to its original width so that the valve 256 will be seated in block 260. The motor 370 will thus be actuated in a counter-clockwise direction to rotate the table clockwise and to restore the original pressure of the roller on the cam. As a consequence of this arrangement whereby the motor always drives the table in the direction indicated by the cam, it will be apparent that the motor may well furnish a major share of the power to the work table so that the remaining power transmitted by the lead screw through the gear system can be reduced to a point where the forces therein are insignificant.

*The machine of Figures 41–45*

As indicated in the introductory paragraphs, the machine of Figures 41–45 is capable of generating surfaces of the general type shown in Figures 4–6. These surfaces are characterized by varying included angles S between the radial sections $b, c, \ldots f$ and the impeller axis.

Each of the lines, $b, c, \ldots f$ in Figure 6, which have been referred to as the radial sections, can also be considered as representing successive positions of a possible generatrix of the surface. From a mechanical standpoint, the generatrix is closely approximated by the cutting edge of the tool. With these considerations in mind, it is at once obvious that the surface of Figures 4–6 could be generated by the machine of Figure 8 if the tool 61 were continuously inclined at a rate related to the axial or rotary motion by gear trains and cam means such as discussed under Subassembly C. This could be accomplished, for example, by pivoting the cutter head 60 on a horizontal axis and providing a drive therefore which is connected to the lead screw 52 and includes a cam.

Instead of continuously inclining the tool 61, the present invention prefers to achieve the same result by a different method in which the inclination of the cutting tool is constant during operation of the machine, though, of course, being manually variable by the means of Figure 15. In this method the radial sections do not represent the generatrix. Instead, it is assumed that the generatrix G makes a fixed angle Sg with the impeller axis as indicated in Figure 6. Successive positions G–1, G–2, of the generatrix are then determined by well known graphical methods such as illustrated in Figures 4–6. It is then apparent from Figure 4 that the generatrix G has a variable lateral or transverse component of motion T with respect to the impeller axis. By imparting such a motion to the generatrix G, that is the cutting tool 61, in addition to the feed motions of the machine of Figure 8, the radial sections $b, c, \ldots f$ may be generated so that they have varying angles of inclination S with the impeller axis.

Figure 41:
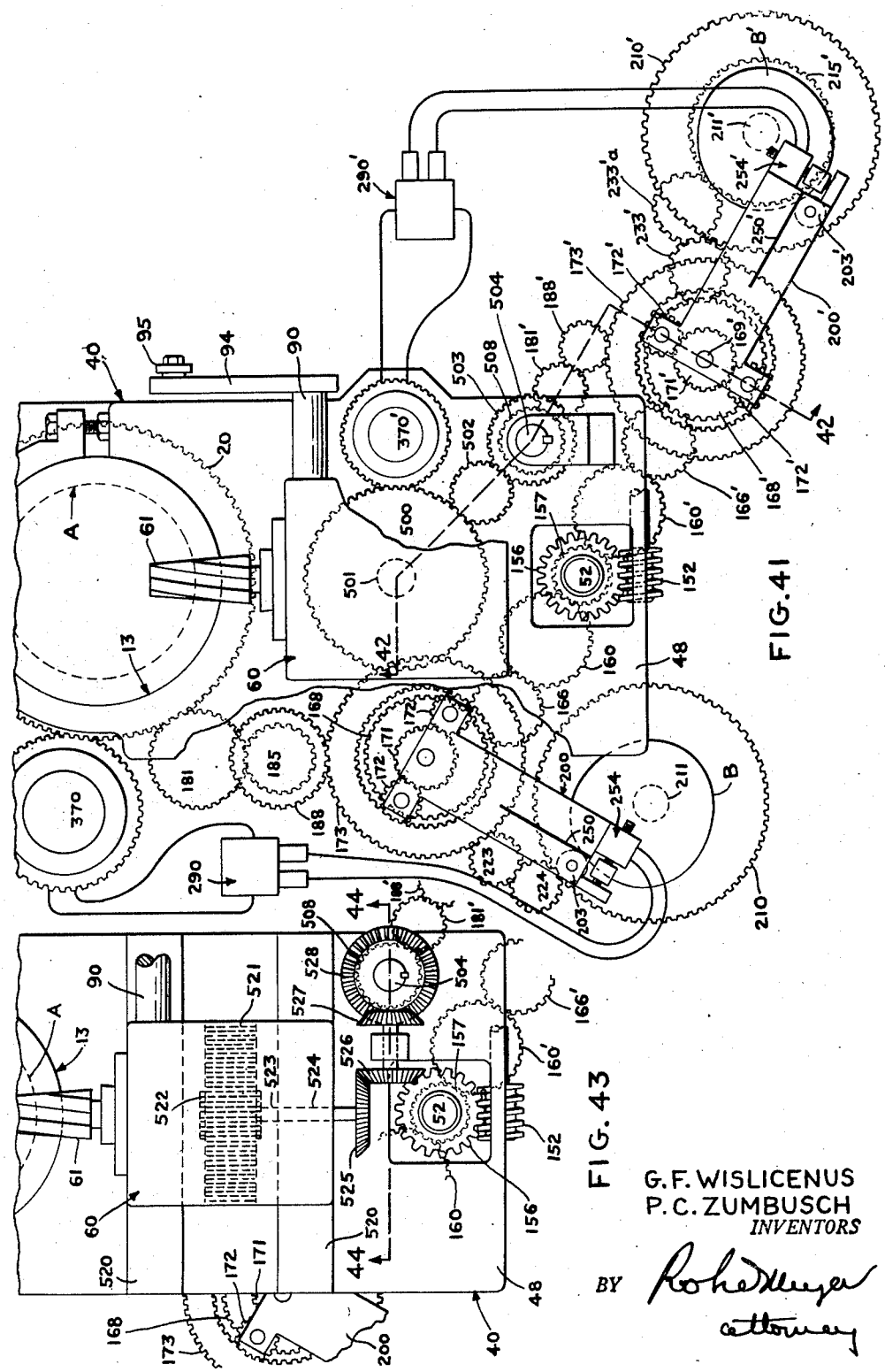
Figure 41 is a plan view, with parts broken away, of a machine having means for providing a lateral component of the feed motion in addition to the means of Figure 8.

Figure 41 is a plan view of a machine which provides for lateral or transverse feed component by means of a cutter head 60 which is pivoted about an axis parallel to the axis of the work. In this machine the rotary motion of the work table 13 and the axial motion of the tool table 40 are interconnected by the same system of gearing that has been previously described in detail under Subassembly C. The reference numerals are the same so a discussion of the operation of these parts need not be repeated.

Figure 42:
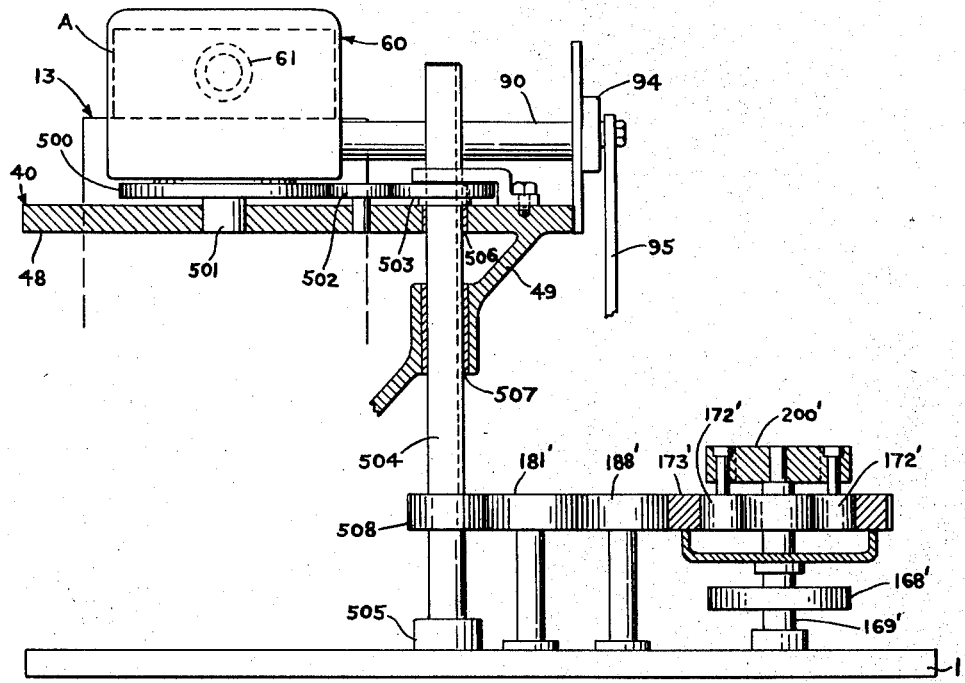
Figure 42 is a somewhat diagrammatic sectional view taken with liberties along line 42—42 of Figure 41.

In the machine of Figures 41 and 42, the cutter head 60 is mounted on a gear 500 for rotation therewith. The gear 500 is pivotally mounted on the tool table top 48 by means of a stub shaft 501. It is seen that by means of the gear 500 the cutting tool 61 may be continuously moved in a lateral direction with respect to the axis of the impeller A. Figure 17 shows how the tool 61 would appear when laterally or transversely offset from the impeller axis due to pivotal movement.

The pivotal lateral movement causes different points on the tool to be offset by different amounts. This must be taken into consideration when laying out successive positions of the generatrix G. In Figure 4, for example, the lines G–1 and G–2 represent a tool edge which is equally offset on all points from the impeller axis. Such motion is accomplished by the device of Figures 43–45, to be described hereinafter.

The gear 500 is driven through the gears 502 and 503 by the shaft 504 which is rotatably mounted at 505 on the base plate 1. Since the tool table 40 has vertical movement and the shaft 504 does not, the shaft is mounted at 506 and 507 in the table 40 so as to permit relative axial and rotary motion. The gear 503 is keyed to the shaft 504 so that it rotates with the shaft while it moves with the table 40.

The shaft 504 is rotated by the lead screw 52 through a gear train which includes differential gearing and cam means for actuating the same, all similar to the system described under Subassembly C. A gear 508 on the shaft 504 is connected by means of gears 181' and 188' to the ring gear 173'. The ring gear 173' is rotated by the two planet gears 172' which are connected to the cam follower 200' and to the sun gear 171'.

The sun gear 171' is attached to the shaft 169' which is suitably mounted on the base plate 1 and rotated by the drive gear 168' fixed thereto. The drive gear 168' is connected by means of gears 166', 160', and 157 to the lead screw 52. Rotation of the sun gear 171' is therefore directly proportional to rotation of the lead screw 52 and thus to vertical movement of the tool table 40.

The cam follower 200', which also moves the planet gears around the sun gear 171', is operatively connected to a cam B'. The cam B' is suitably mounted on a table 210' which is connected to the rotatable shaft 211'. The shaft 211' has a gear 215' fixed thereto which is rotated by the lead screw 52 through the gears 233' and 233'a which are connected to the drive gear 168'. This will be recognized as gear set-up (3) described in connection with Subassembly C.

The cam B' is designed to properly relate the transverse position T (Figure 4) of the cutting tool 61 to the axial position of the tool. The cam signals are translated into movements of the cam follower 200' to be superimposed on the movements imparted to the planet gears 172' by the sun gear 171'. The resultant motion of the planet gears 172' rotates the ring gear 173' which drives the shaft 504 and thus pivotally moves the cutter head 60 so that it imparts lateral motion to the cutting tool 61 in accordance with cam directions. At the same time, of course, the gear and cam system of Subassembly C will be imparting axial motion to the tool table 40 and rotary motion to the work table 13 so that the tool 61 has three components of feed motion, rotary, axial, and lateral. The cams B and B' will continuously vary the ratios among these three components according to a predetermined pattern determined by the geometry of the surface being machined.

A follow-up system, such as that described in Subassembly D, may also be used to make the lateral movements of the tool 61 accurately responsive to cam signals. The pneumatic pick-up valve 254' it attached to the end of the follower 200' so as to detect variations in the width of the slit 250'. The signals of valve 254' control the valve action in the oil control valve 290'. As before, the valve 290 determines the direction of rotation of the hydraulic motor 370' which is connected to the gear 500.

Instead of pivotal movement, the cutter head 60 may be laterally moved parallel to itself so that all points on the cutting edge of the tool are offset from the impeller axis by equal amounts. This is shown in Figures 4 and 16. The machine for imparting this type of transverse feed is partially shown in Figures 43–45. The gear train and cam means relating the lateral feed to the axial feed are the same as that shown in Figures 41 and 42. The axial feed and rotary feed are related by the means of Subassembly C.

Figures 44, 45:
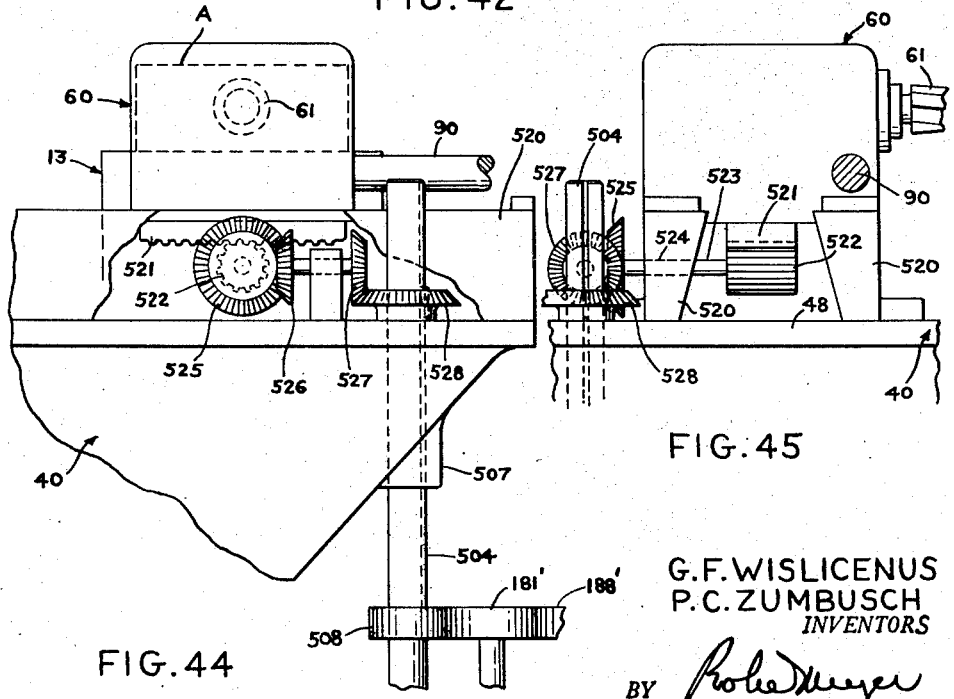
Figure 44 is a view taken along line 44—44 of Figure 43.
Figure 45 is a side elevation taken at the right of Figure 43.

In Figures 43–45 the cutter head 60 is slidably mounted on ways 520 for movement transverse to the axis of the impeller. As shown, the ways are fixed to the table top 48. The cutter has a transverse rack 521 on the bottom thereof which is engaged by a pinion 522. This pinion has a shaft 523 which is rotatably carried by one of the ways 520, as shown at 524. A bevel gear 525 is fixed to the outer end of the shaft 523 and is driven through bevel gears 526, 527, and 528 by the vertical shaft 504. Gear 528, like gear 503, rotates with the shaft 504 but moves axially with the table 40. It will thus be recognized that the cam B' and the lead screw 52 acting through the differential gearing 171', 172', and 173' rotate the shaft 504 which actuates the pinion 522 to transversely move the cutter head 60 in accordance with cam signals. The transverse cutter movement of Figure 43 is linear in contrast to the movement imparted by the device of Figure 41 which is arcuate.

The machines of Figures 41–45 have the cutter head 60 which has been described in detail under Subassembly B. Consequently, these machines also provide a radial feed motion which is proportional to the axial feed motion. Since the cutter head now has a transverse motion, the attachment of the rod 95 to the base plate 1 (not shown) must provide for sliding movement of the connection 100 between the rod and the base plate. This could be accomplished, for example, by inserting the end of the rod 95 in a dovetailed slot (not shown) in the base plate 1 which is parallel to the path of transverse movement of the cutter head 60.

In Figures 4–6 the generatrix G is shown as a straight line which, of course, means that the cutting tool 61 must be either cylindrical or conical depending upon the angle of inclination Sg. It will be noted, however, that the surfaces which can be generated are not limited to those comprising straight line elements. The generatrix G may be a curved line, in which case the cutting tool 61 will have the shape of a surface of revolution generated by said curved line.

The scope of the present invention is intended to be defined by the appended claims and not to be limited to the construction and arrangement of parts illustrated since it is recognized that equivalent devices are known which, when substitued for the specific structure shown, will perform the same functions in substantially the same way.

What is claimed is:

1. A generating machine comprising a base plate, a vertical support column mounted on said base plate, a cylindrical work holding table rotatably mounted on said column, a tool table slidably mounted on said cylindrical work holding table for vertical movement, said tool table having at least one horizontal table-like extension, at least one cutter fixed to said extension, a cutting tool included in said cutter, said cutter being arranged so that the axis of said tool is substantially horizontal and radial with respect to the axis of the column, first means included in said cutter head for moving said tool radially with respect to the axis of said column, means for moving said tool table vertically comprising a lead screw threadably connected to said tool table and driving means for rotating said lead screw, means for rotating said work holding table and for varying the ratio of its rate of rotation to the rate of vertical movement of the tool table comprising planetary differential gearing including planet gears, a ring gear, and a sun gear, a gear train operatively connecting said lead screw to said sun gear, a gear train operatively connecting said ring gear to said cylindrical work table, a plate cam, a gear train operatively connected to said driving means and to said cam for rotating said cam, a cam follower operatively connected to the periphery of said cam and to said planet gears to transmit variations in the radius of the peripheral contour of said cam into orbital movement of said planet gears and thus vary the transmission ratio between said sun gear and said ring gear in accordance with variations in the radius of the cam periphery, change gears included in said gear trains for varying the transmission ratios thereof, and a member connected to said first means and to said base plate for actuating said first means upon movement of said tool table to radially move said tool in proportion to the vertical movement of the tool table.

2. The device of claim 1 combined with means for furnishing additional power to rotate said work holding table comprising a pressure fluid motor operatively connected to said work holding table, a flow control valve connected to said motor for controlling the flow of pressure fluid thereto, and means actuated by variations in the contact pressure between said cam follower and the periphery of said cam connected to said flow control valve for actuating the same.

3. Means for vertically inclining the axis of the cutting tool to the axis of the column in the device of claim 1 comprising wedge shaped blocks adapted to be inserted between the bottom of said cutter and the top of said extension, the wedge angle of said blocks being the complement of the included vertical angle between the axis of the cutting tool and the axis of the column.

4. A generating machine comprising a frame, a vertical column on said frame, a cylinder rotatably mounted on said column, means for rotating said cylinder, work holding means attached to said cylinder, a tool table slidably mounted on said column for axial movement, at least one generating tool mounted on said tool table, means for axially moving said tool table, a gear train interconnecting the means for rotating the cylinder and the means for axially moving the tool table, differential gearing included in said gear train, and cam means operatively connected to said differential gearing for actuating said differential gearing to vary the transmission ratio between said two means.

5. In a generating machine, a work holding member, at least one generating tool member having its axis substantially normal to the axis of the work holding member, means providing relative rotary movement between said members, means providing relative axial movement between said members, means providing relative lateral movement between said members, gear trains connecting two of said means to the third so that motions imparted by two of said means are proportional to the motions imparted by the third, differential gear in said gear trains for varying the transmission ratio thereof, means for actuating said differential gearing to vary the proportionality between said motions comprising cam means and cam follower means operatively connected to said cam means and to said differential gearing, means actuated by variations in the contact pressure between said cam means and said cam follower means for furnishing supplemental power to said movement providing means, and means providing radial feed of said tool member with respect to the axis of said work holding member, said feed being proportional to one of said movements.

6. In a generating machine, a work holding member, a tool carrier member capable of relative longitudinal and circumferential movement with respect to said work holding member, at least one cutter head movably mounted on said tool carrier, a cutting tool included in said cutter head, said cutter being disposed so that the axis of said cutting tool is substantially perpendicular to and radial to the axis of said work holding member, first means connected to at least one of said members for imparting said relative longitudinal and circumferential movements to said tool carrier member and thus to the cutter and tool mounted thereon, second means connected to said first means and to said cutter head for moving the head so that the cutting tool moves transversely with respect to the axis of the work holding member, a gear train included in said first means for the purpose of making said relative movements proportional, a gear train included in said second means for the purpose of making the transverse movement of said cutting tool proportional to one of the other of said movements, differential gearing systems included in each of said gear trains to provide means for varying the ratios established by said gear trains during the operation thereof, change gears included in said gear trains to provide means for manually changing the ratios established by said gear trains when the gear trains are not operating, independent means connected to each of said differential gearing systems for actuating the same, plate cams included in each of said independent means, means for rotating said cams included in each of said independent means, and cam followers included in each of said independent means operatively connected to the cam surfaces of said plate cams and to said differential gear systems for the purpose of transmitting cam indications of the desired variations in the ratios established by said gear trains into variation effecting movements of said differential gear systems.

7. In a generating machine having a work holding member and a tool carrier member and operating means providing longitudinal and circumferential movements of said members relative to each other, the combination of at least one cutter head pivotally mounted on said tool carrier member, a cutting tool included in said cutter head, said head and tool being arranged on said tool carrier member so that the axis of said tool is substantially normal and radial to the axis of said work holding member, means connected to said operating means and to said cutter head for pivotally moving said cutter head in amounts proportional to one of said movements provided by said operating means thus pivotally moving said cutting tool transversely of the axis of said work holding member in a plane substantially normal thereto, and means connected to said last mentioned means for varying the rate of pivotal movement of said cutter head in a predetermined manner and thus varying the proportion between said pivotal movement and said one movement.

8. In a generating machine, a tool table, at least one cutter head pivotally mounted on said tool table, a cutting tool included in said cutter head, a rotatable work table adapted to support the work to be machined for rotation thereof on an axis substantially vertical to the axis of said cutting tool, said tool table being mounted on said work table for movement in a direction parallel to the axis of rotation of the work, first means for rotating said work table, second means for moving said tool table, a first gear train interconnecting said means, differential gearing included in said gear train, a first cam for actuating said differential gearing to vary the transmission rate of said gear train, a first cam follower operatively connected to said cam and to said differential gearing, third means for pivotally moving said cutter, a second gear train interconnecting said third means and a fixed ratio part of said first gear train, differential gearing included in said second gear train, a second cam for actuating said differential gearing to vary the transmission ratio of said second gear train, and a second cam follower operatively connected to said second cam and to said differential gearing in the second gear train.

9. In a generating machine, a rotatable work table adapted to support the work to be machined for rotation, a tool table mounted on said work table for movement parallel to the axis of rotation of the work, at least one cutter head including a tool mounted on said tool table for transverse movement with respect to said axis in a plane normal to said axis, first means for rotating said work table, second means for moving said tool table, a first gear train interconnecting said means, differential gearing included in said gear train, a first cam for actuating said differential gearing to vary the transmission ratio of said gear train, a first cam follower operatively connected to said cam and to said differential gearing, third means for transversely moving said cutter head, a second gear train interconnecting said third means and a fixed ratio part of said first gear train, differential gearing included in said second gear train, a second cam for actuating said differential gearing to vary the transmission ratio of said second gear train, and a second cam follower operatively connected to said second cam and to said differential gearing in the second gear train.

10. In a generating machine, work holding means for holding the work to be machined, cutting tool means having its axis substantially normal to the axis of the work held by the work holding means, means for producing a relative helical generating motion of substantially constant pitch, and means included in said last mentioned means for producing predetermined departures of said generating motion from a helix of constant pitch comprising a differential speed element for varying the ratio between the components of the helical generating motion, a cam for indicating said predetermined departures, and a cam follower operatively connected to said cam and to said differential speed element for actuating the latter to vary said rates in accordance with the predetermined departures indicated by said cam, means actuated by variations in the contact pressure between said cam means and said cam follower means for furnishing supplemental power to at least one of said movement providing means.

11. In a generating machine, a stationary work table supporting column, a work table cylinder rotatably carried by said column, a work supporting plate adjustably carried by said cylinder, a cutter head carrying table, means adjustably supporting said cutter head carrying table for movement parallel to the axis of rotation of said cylinder, a cutter head including a cutting tool mounted on said cutter head carrying table for transverse movement with respect to said axis in a plane normal to said axis, a cutting tool rotating shaft carried by said cutter head, means for rotating said shaft, means for moving said shaft axially during the rotation thereof including a rocker shaft, means mounting said rocker shaft for pivotal movement, and means connected to said rocker shaft for pivotally moving it upon movement of the cutter head carrying table axially of said cylinder.

12. In a generating machine, a stationary work table supporting column, a work table cylinder rotatably carried by said column, a work supporting plate adjustably carried by said cylinder, generating tool means, means for producing a rotary component of the feed motion of said tool means relative to work held on said work supporting plate, means for producing an axial component of motion of said tool means relative to work on said work supporting plate, driving means operably connected to both of said motion producing means, and a gear train inter-connecting said two motion producing means so that said two components of feed motion are basically in constant ratio.

13. In a generating machine, a stationary work table supporting column, a work table cylinder rotatably carried by said column, a work supporting plate adjustably carried by said cylinder, a cutter head carrying table, a supporting portion on said table mounted on said cylinder for supporting the cutter head carrying table for movement axially of the cylinder, a cutting tool carried by said table, means for rotating said cutting tool, means for moving said table axially of said cylinder, a gear train interconnecting said cutting tool rotating means and said table moving means so that their movements are basically in constant ratio.

14. In a generating machine, a stationary work table supporting column, a work table cylinder rotatably carried by said column, a work supporting plate adjustably carried by said cylinder, a cutter head carrying table, a supporting portion on said table mounted on said cylinder for supporting the cutter head carrying table for movement axially of the cylinder, a cutting tool carried by said table, means for rotating said cutting tool, means for moving said table axially of said cylinder, a gear train interconnecting said cutting tool rotating means and said table moving means so that their movements are basically in constant ratio, differential gearing included in said gear train, a cam, and a cam follower operatively connected to said cam and to said differential gearing whereby said cam actuates said differential gearing to modify said constant ratio between the axial movement of the table and the rotary movement of the cutting tool.

15. In a generating machine, a stationary work table supporting column, a work table cylinder rotatably carried by said column, a work supporting plate adjustably carried by said cylinder, a cutter head carrying table, a supporting portion on said table mounted on said cylinder for supporting the cutter head carrying table for movement axially of the cylinder, a cutting tool carried by said table, means for rotating said cutting tool, means for moving said table axially of said cylinder, a gear train interconnecting said cutting tool rotating means and said table moving means so that their movements are basically in constant ratio, differential gearing included in said gear train, a cam, and a cam follower operatively connected to said cam and to said differential gearing whereby said cam actuates said differential gearing to modify said constant ratio between the axial movement of the table and the rotary movement of the cutting tool, and indexing means for regulating the relative positions of the work supporting plate and cylinder.

16. In a generating machine, a stationary work table supporting column, a work table cylinder rotatably carried by said column, a work supporting plate adjustably carried by said cylinder, a cutter head carrying table, means adjustably supporting said cutter head carrying table for movement parallel to the axis of rotation of said cylinder, a cutter head including a cutting tool mounted on said cutter head carrying table for transverse movement with respect to said axis in a plane normal to said axis, a cutting tool rotating shaft carried by said cutter head, means for rotating said shaft, means for moving said shaft axially during the rotation thereof including a rocker shaft, means mounting said rocker shaft for pivotal movement, and means connected to said rocker shaft for pivotally moving it upon movement of the cutter head carrying table axially of said cylinder, said means for pivotally moving said rocker shaft including an adjustable member adjustable to vary the ratio of vertical movement of the cutter head carrying table to axial movement of said cutter head.

17. In a generating machine, a stationary work table supporting column, a work table cylinder rotatably carried by said column, a work supporting plate adjustably carried by said cylinder, a cutter head carrying table, means adjustably supporting said cutter head carrying table for movement parallel to the axis of rotation of said cylinder, a cutter head including a cutting tool mounted on said cutter head carrying table for transverse movement with respect to said axis in a plane normal to said axis, a cutting tool rotating shaft carried by said cutter head, means for rotating said shaft, means for moving said shaft axially during the rotation thereof including a rocker shaft, means mounting said rocker shaft for pivotal movement, and means connected to said rocker shaft for pivotally moving it upon movement of the cutter head carrying table axially of said cylinder, including a pivotally mounted lever, said lever formed of adjustably connected sections, means adjustably connecting said lever to said rocker shaft for moving the rocker shaft whereby the ratio of vertical movement of the cutter head carrying table to axial movement of the cutter head may be varied.

18. In a generating machine, a stationary work table supporting column, a work table cylinder rotatably carried by said column, a work supporting plate adjustably carried by said cylinder, a cutter head carrying table, means adjustably supporting said cutter head carrying table for movement parallel to the axis of rotation of said cylinder, a cutter head including a cutting tool mounted on said cutter head for transverse movement with respect to said axis in a plane normal to said axis, a feed screw connected to said cutter head table for moving the table axially of said cylinder, means for rotating said feed screw, and gearing connecting said feed screw and cylinder for rotating the cylinder.

19. In a generating machine, a rotatable work holding cylinder, a tool carrier mounted for movement axially of said cylinder, a cutting tool carried by said tool carrier, means for rotating said cutting tool, means for moving said tool carrier axially of said cylinder, a motor, gearing connecting said motor to said tool carrier moving means and to said cylinder for rotating the cylinder, and second means for rotating the cylinder including a hydraulic motor, valve means for controlling operation of said hydraulic motor, a cam, a cam follower operatively connected to said cam and to said gearing, and means actuated by said cam follower for controlling operation of said valve means.

20. In a generating machine, a rotatable work holding cylinder, a tool carrier mounted for movement axially of said cylinder, a cutting tool carried by said tool carrier, means for rotating said cutting tool, means for moving said tool carrier axially of said cylinder, a motor, gearing connecting said motor to said tool carrier moving means and to said cylinder for rotating the cylinder, and second means for rotating the cylinder including a hydraulic motor, valve means for controlling operation of said hydraulic motor, a cam, a cam follower operatively connected to said cam and to said gearing, said cam follower having a slit effectively dividing its outer end into two legs, one of said legs being operatively connected to said cam whereby variations in the contact pressure between said leg and said cam will vary the width of the slit, and means actuated by variation in the width of said slit for controlling operation of said valve means.

21. In a generating machine, a rotatable work holding cylinder, a tool carrier mounted for movement axially of said cylinder, a cutting tool carried by said tool carrier, means for rotating said cutting tool, means for moving said tool carrier axially of said cylinder, a motor, gearing connecting said motor to said tool carrier moving means and to said cylinder for rotating the cylinder, and second means for rotating the cylinder including a hydraulic motor, valve means for controlling operation of said hydraulic motor, a cam, a cam follower operatively connected to said cam and to said gearing, and means actuated by variations in the contact pressure between said cam follower and said cam for actuating said valve means.

GEORGE F. WISLICENUS.
PETER C. ZUMBUSCH.

References Cited in the file of this patent

UNITED STATES PATENTS

| Number | Name | Date |
|---|---|---|
| 1,077,279 | Ito | Nov. 4, 1913 |
| 1,614,558 | Kasley | Jan. 18, 1927 |
| 1,949,062 | Marriott et al. | Feb. 27, 1934 |
| 2,183,363 | Zimmerman | Dec. 12, 1939 |
| 2,239,927 | Morton | Apr. 29, 1941 |
| 2,289,874 | Curtis | July 14, 1942 |
| 2,385,354 | Gaudreau | Sept. 25, 1945 |
| 2,390,828 | Dorman | Dec. 11, 1945 |
| 2,392,963 | Armitage et al. | Jan. 15, 1946 |
| 2,428,301 | Surerus | Sept. 30, 1947 |
| 2,429,324 | Meisser | Oct. 21, 1947 |
| 2,452,544 | Brodie | Nov. 2, 1948 |
| 2,524,091 | Zimmermann | Oct. 3, 1950 |

FOREIGN PATENTS

| Number | Country | Date |
|---|---|---|
| 478,569 | Great Britain | Jan. 17, 1938 |
| 567,744 | Great Britain | Mar. 1, 1945 |
| 572,051 | Great Britain | Sept. 20, 1945 |